United States Patent [19]
Hol

[11] Patent Number: 4,542,382
[45] Date of Patent: Sep. 17, 1985

[54] SEARCH RADAR APPARATUS

[75] Inventor: Willem A. Hol, Hengelo, Netherlands

[73] Assignee: Hollandse Signaalapparaten B.V., Hengelo, Netherlands

[21] Appl. No.: 392,115

[22] Filed: Jun. 25, 1982

[30] Foreign Application Priority Data

Jul. 2, 1981 [NL] Netherlands ............ 8103178

[51] Int. Cl.$^4$ .................... G01S 13/54
[52] U.S. Cl. .................. 343/7.7; 343/7 A
[58] Field of Search ............ 343/7.7, 7 A, 7.5, 7.4

[56] References Cited

U.S. PATENT DOCUMENTS

| 4,119,962 | 10/1978 | Lewis | 343/7.7 |
| 4,249,178 | 2/1981 | Butler | 343/7.7 |
| 4,290,066 | 9/1981 | Butler | 343/7.5 X |
| 4,386,353 | 5/1983 | Bleijerveld et al. | 343/7 A |

OTHER PUBLICATIONS

R. M. O'Donnell et al, "Automated Tracking for Aircraft Surveillance Radar Systems", IEEE Trans. AES, vol. 4, Jul. 1979, pp. 508–517.
M. I. Skolnik, "MTI and Pulse Doppler Radar", Introduction to Radar Systems, Chapter 4, pp. 101–151, 1980.
C. E. Muehe et al, "The Parallel Microprogrammed Processor (PMP)", International Conference Radar '77, Oct. 1977.

Primary Examiner—T. H. Tubbesing
Assistant Examiner—John B. Sotomayor
Attorney, Agent, or Firm—Robert J. Kraus

[57] ABSTRACT

Search radar apparatus containing an MTI video processing unit provided with: a canceller for generating video signals of moving targets; a zero-velocity filter for generating clutter video signals; a conditional circuit connected to the canceller and the filter for generating per range quant of each radar scan a clutter switching signal if for the rang quant the signal value obtained with filter is greater than the signal value obtained with the canceller; a combination circuit connected to said filter and the conditional circuit for selecting the clutter video signals present with the clutter switching signals and for determining therefrom a temporary clutter level in each clutter cell and each antenna revolution period; and clutter level indication means connected to the combination circuit for determining a standard clutter level per range-azimuth clutter cell of the radar range with the application of clutter video signals.

16 Claims, 27 Drawing Figures

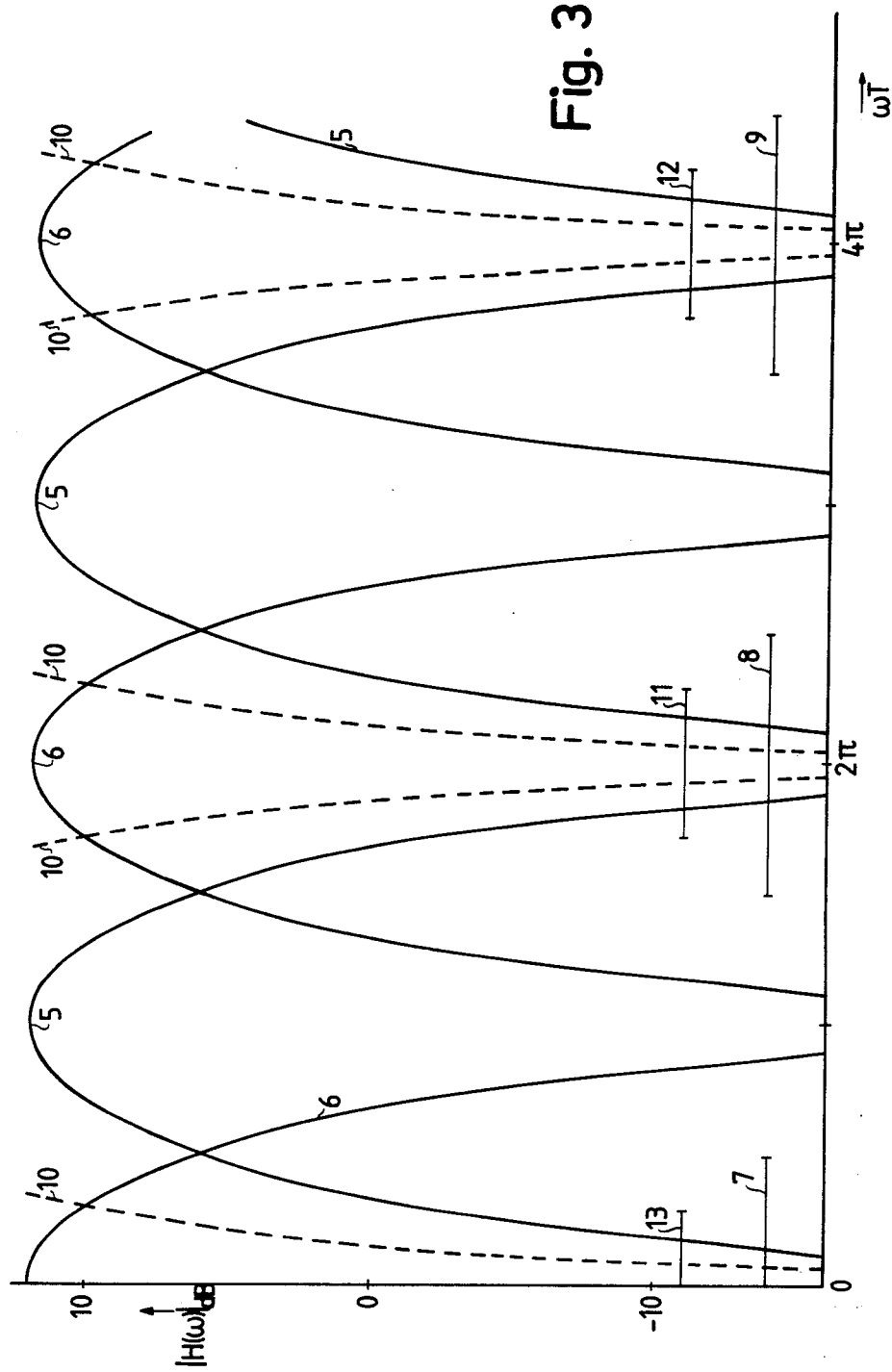

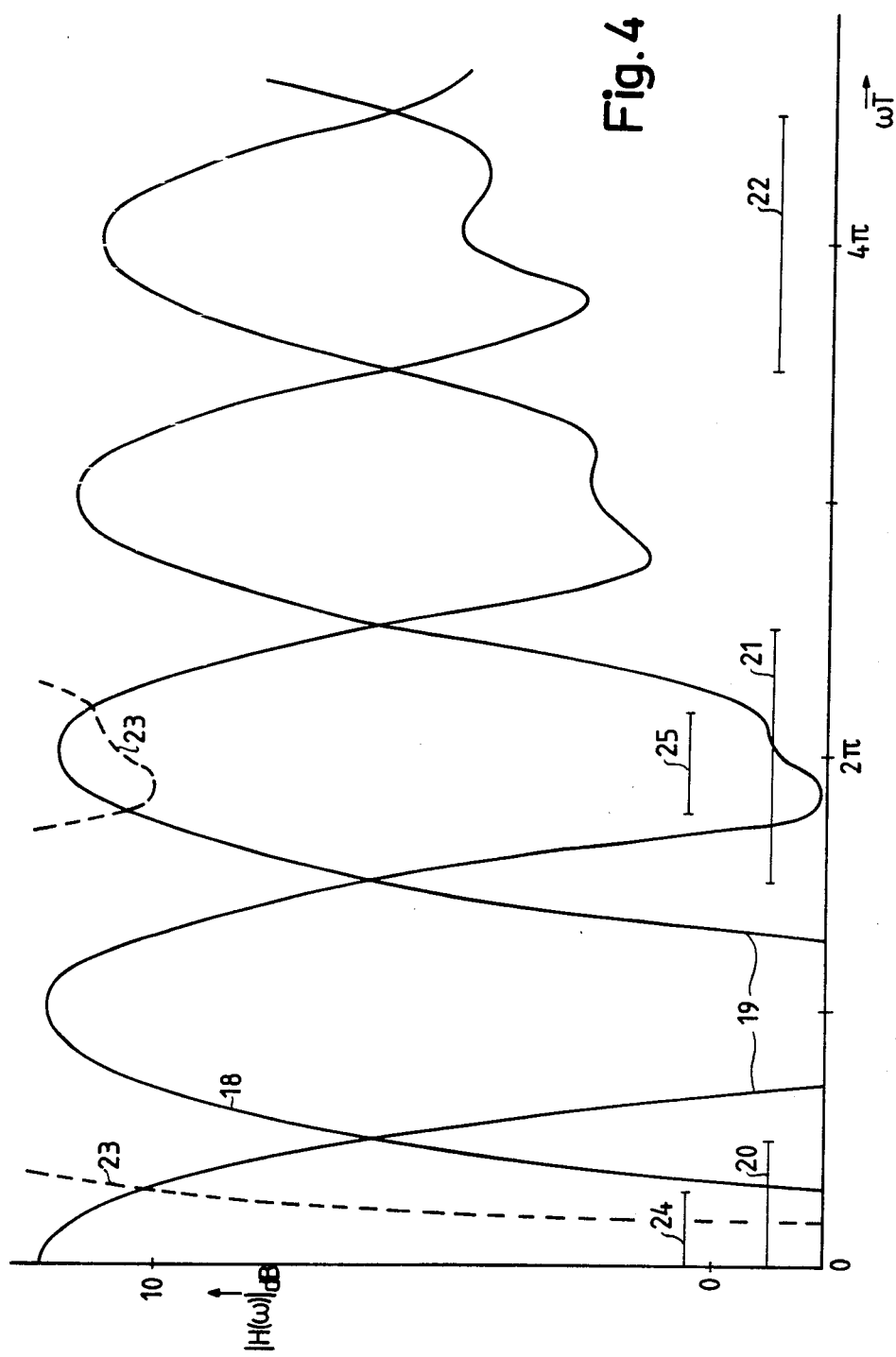

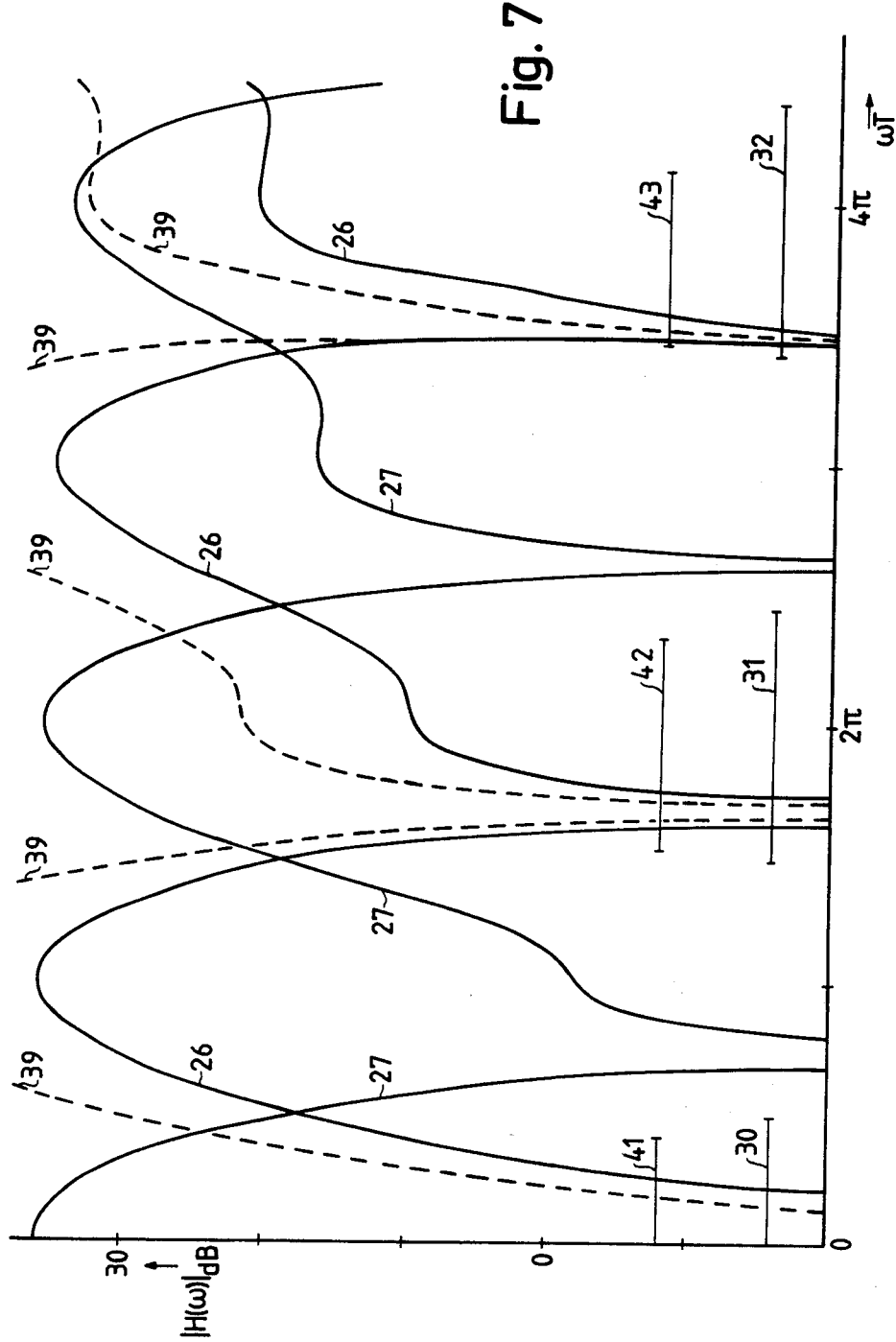

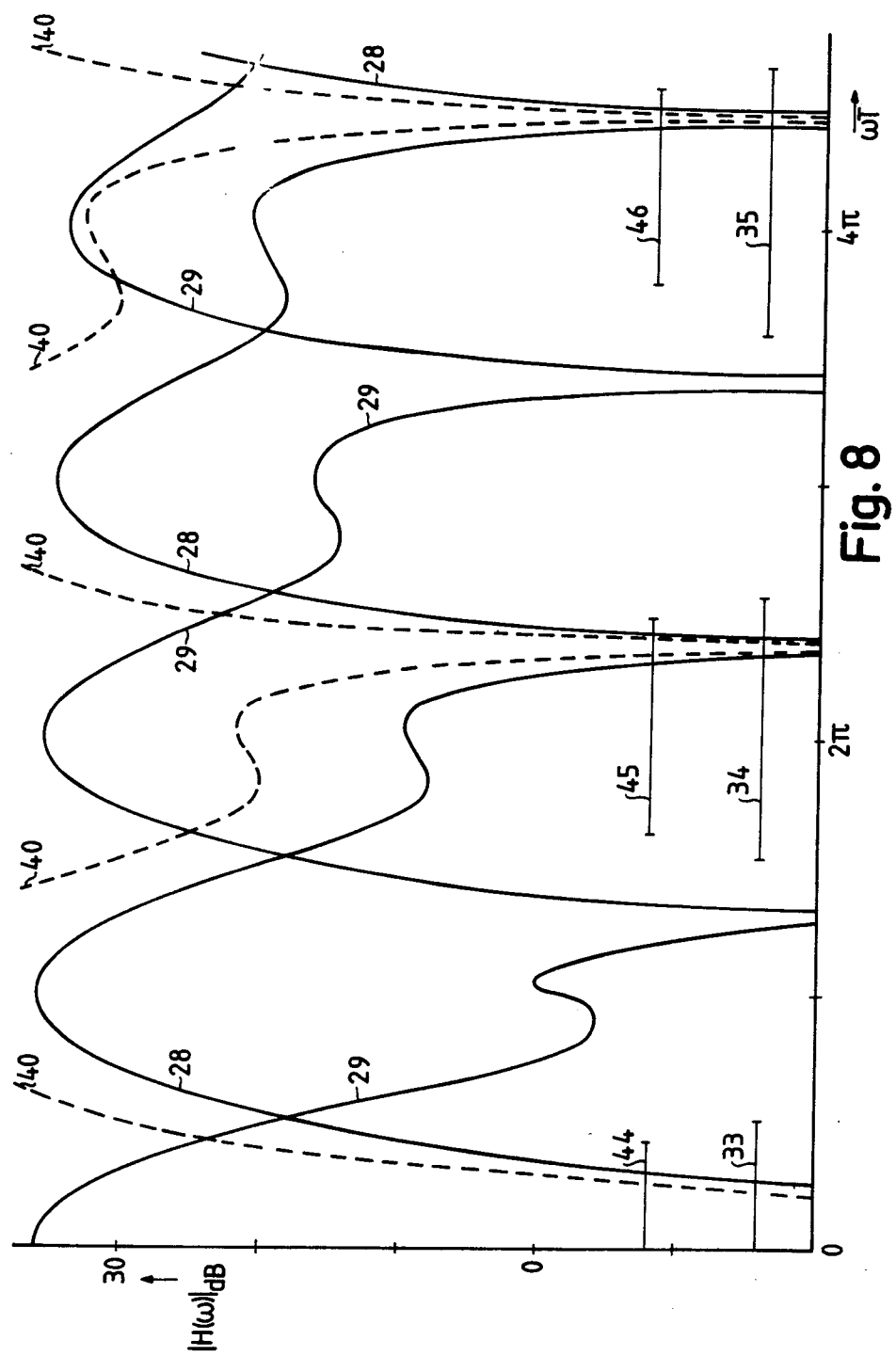

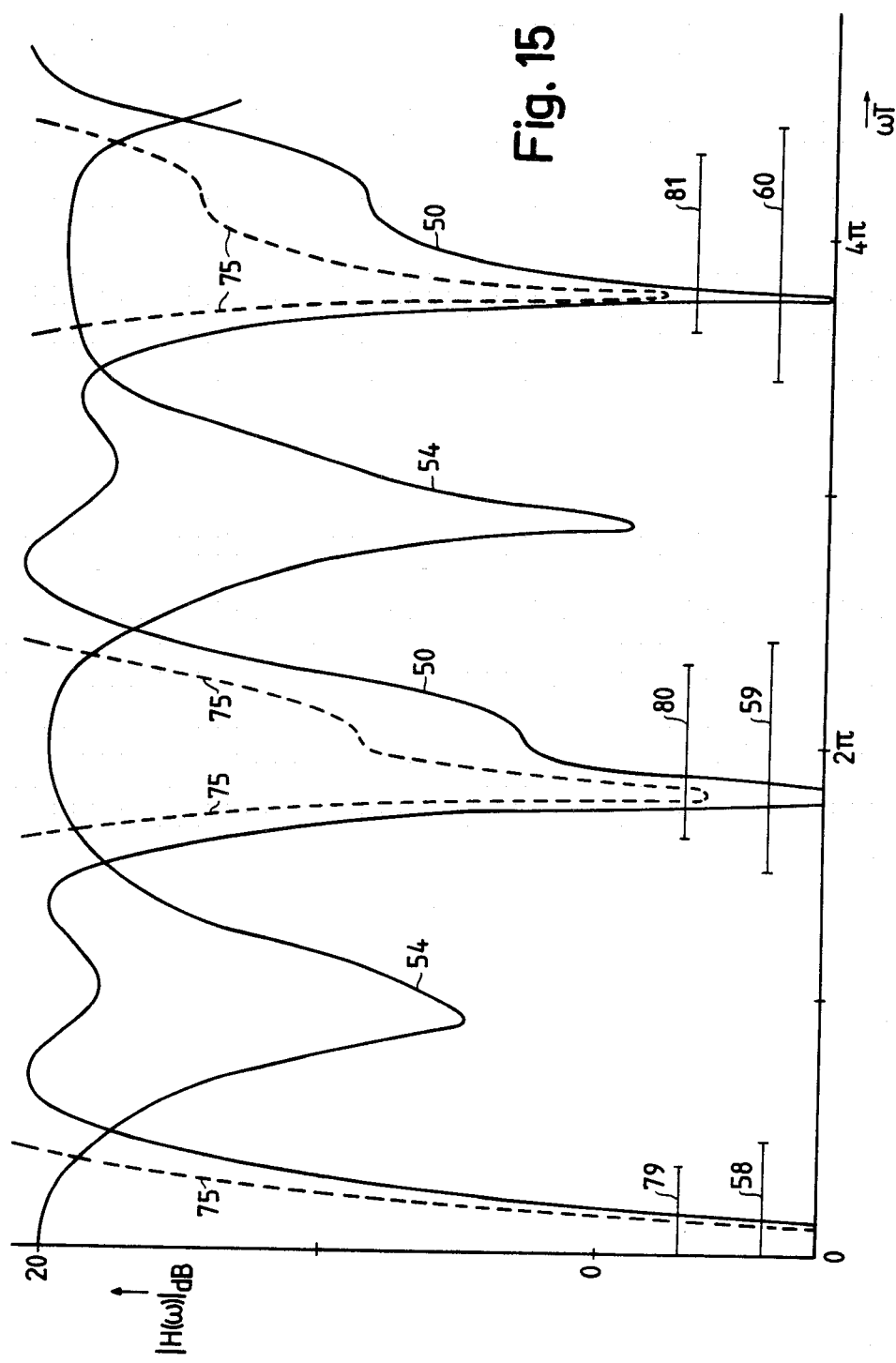

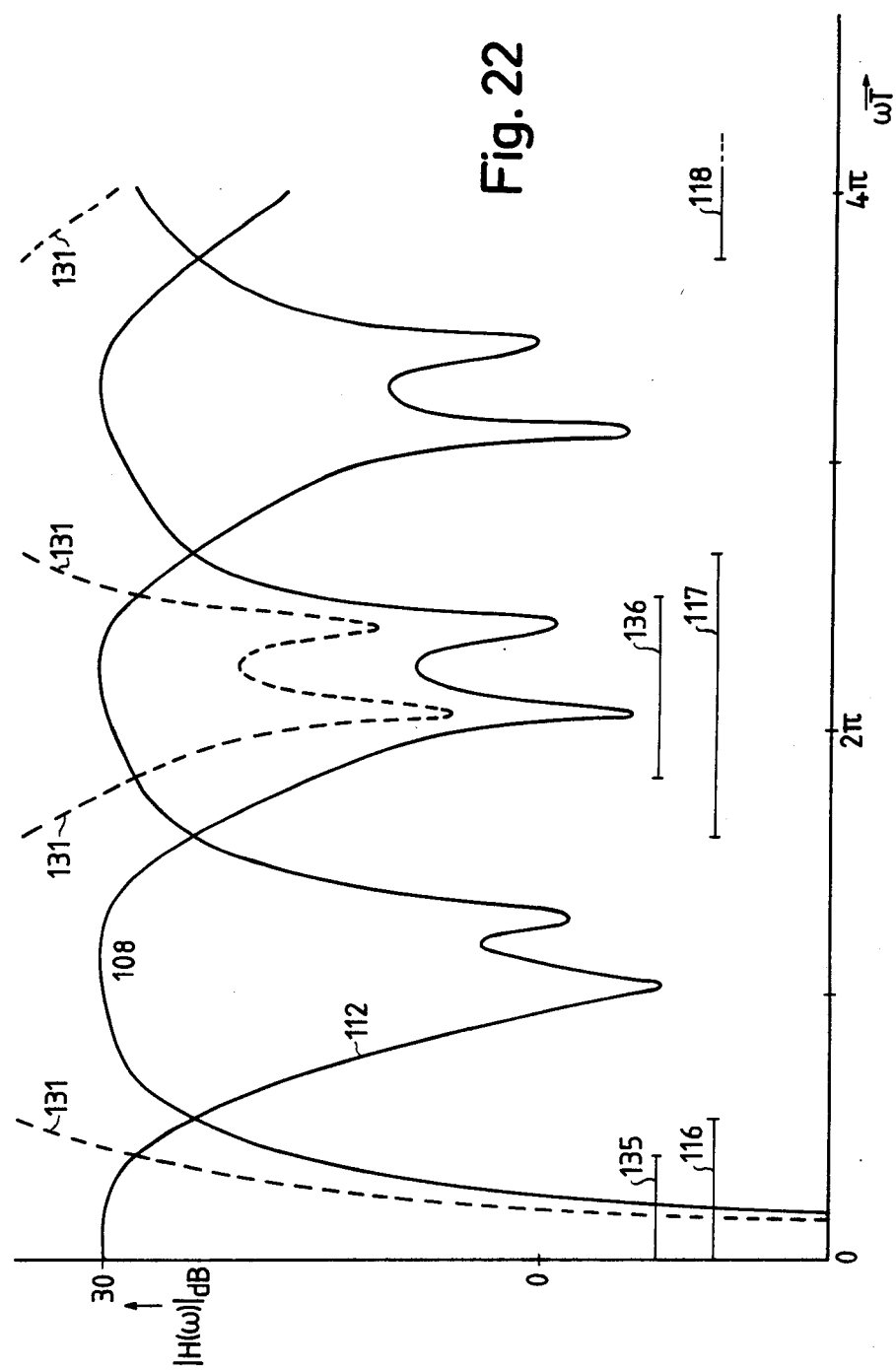

SEARCH RADAR APPARATUS

BACKGROUND OF THE INVENTION

The invention relates to a search radar apparatus containing an MTI video processing unit provided with a canceller for generating video signals of moving targets, a zero-velocity filter for generating clutter video signals, and clutter level indication means for determining a standard clutter level per range-azimuth clutter cell of the radar range, using clutter video signals.

Such a search radar apparatus is known from IEEE Transactions on Aerospace and Electronic Systems, Vol. AES-15, No. 4, July 1979, pp. 508–516, where the video signals passed through the zero-velocity filter and exceeding a certain threshold are selected for the processing of these signals by the clutter level indication means, containing a recursive filter and a clutter memory connected thereto. The utilization of a zero-velocity filter with a substantially rectangular filter characteristic has the advantage that the video signal selection occurs purely on a frequency basis. It is however a costly matter to manufacture such a filter; moreover, it is difficult to realize. The use of a more economical zero-velocity filter, whose filter characteristic deviates considerably from the rectangular shape, requires a clutter signal selection not on frequency exclusively, but on frequency and amplitude. In this case, it is possible that a video signal of a certain amplitude and at a certain doppler frequency situated in the first stop band of the filter characteristic, has a filter response below the threshold value, whereas a video signal of a much greater amplitude and a slightly higher frequency in the first stop band has a filter response exceeding this threshold value. A video signal selection made in this way will result in an incorrect indication of the ground clutter and quasistationary targets present; this must be considered as a disadvantage of the search radar apparatus containing such an MTI video processing unit.

SUMMARY OF THE INVENTION

The present invention has for its object to provide a solution for the above problem by making a video signal selection on the basis of frequency magnitude, but enabling, if necessary, a separate amplitude-depending selection.

According to the invention, the MTI video processing unit of the search radar apparatus as set forth in the opening paragraph comprises a conditional circuit connected to the canceller and the zero-velocity filter for generating per range quant of each radar scan a clutter switching signal if for the range quant the signal value obtained with the zero-velocity filter is greater than the signal value obtained with the canceller, and further comprises a combination circuit connected to the zero-velocity filter and the conditional circuit for selecting the clutter video signals present with the clutter switching signals and for determining from the thus selected clutter video signals a temporary clutter level in each clutter cell and each antenna revolution period for application to the clutter level indication means to produce a standard clutter level.

BRIEF DESCRIPTION OF THE DRAWINGS

The invention will now be described with reference to the accompanying figures, of which:

FIG. 3 shows characteristics of a first type canceller and zero-velocity filter in a pulse radar apparatus operating at fixed pulse repetition times;

FIG. 4 shows characteristics of the first type canceller and zero-velocity filter in a pulse radar apparatus operating at alternating pulse repetition times;

FIGS. 7 and 8 illustrate a number of characteristics of a canceller and a zero-velocity filter of the types shown in FIGS. 5 and 6 in a pulse radar apparatus operating at alternating pulse repetition times;

FIGS. 15 to 18 show a number of characteristics of a canceller and a zero-velocity filter of the types shown in FIGS. 14 and 13, respectively, in a pulse radar apparatus operating at alternating pulse repetition times.

FIGS. 22 to 25 are a number of characteristics of a canceller and a zero-velocity filter of the type shown in FIG. 21 in a pulse radar apparatus operating at alternating pulse repetition times.

DESCRIPTION OF THE PREFERRED EMBODIMENTS

Figure 1:
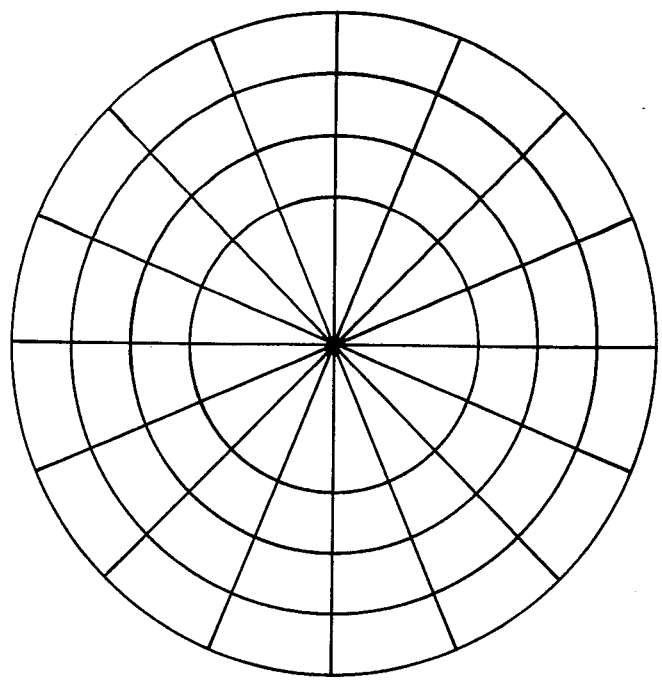
FIG. 1 illustrates the radar range of a search radar apparatus.

FIG. 1 shows a division of the radar range of a search radar apparatus into zones, as obtained with azimuth sectors of equal magnitude and equidistant rings around the radar measuring center. Each of these zones, hereinafter called clutter cells, is cut by a number of successive radar scans and have a length of several range quants, whose magnitude is determined by the interval between two successive clock pulses generated by the radar apparatus. Each clutter cell can thus be regarded to consist of a number of so-called range-azimuth resolution cells, each of which having a length corresponding with a range quant and an azimuth equal to the angle between two successive radar scans.

Figure 2:
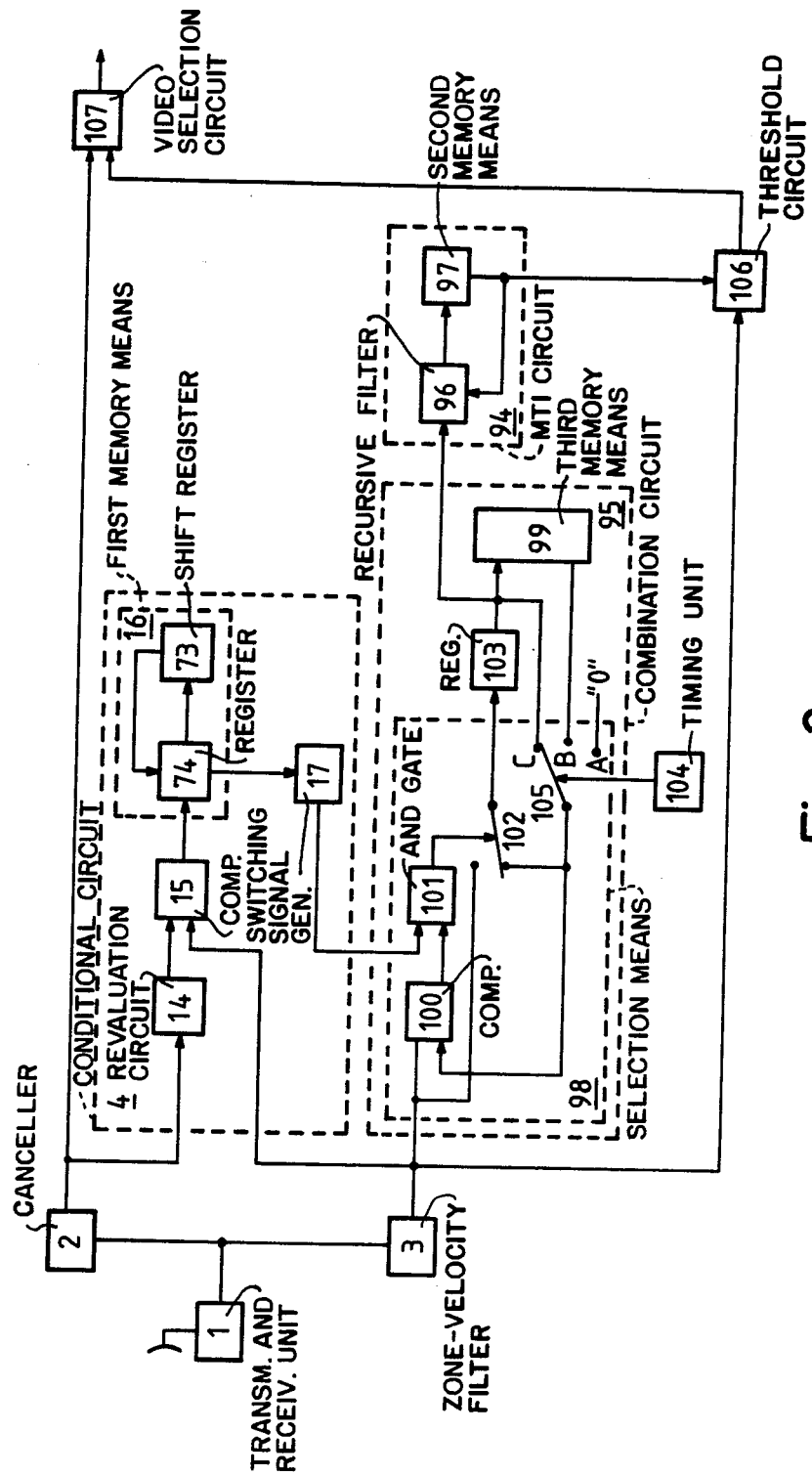
FIG. 2 is a block diagram of a search radar apparatus containing an MTI video processing unit.

In FIG. 2 the block diagram of the search radar apparatus shows a transmitter and receiver unit 1 for generating transmitter pulses and for detecting coherently the echo signals received. For the processing of the coherently detected video signals the radar apparatus comprises an MTI video processing unit, containing at least a canceller 2, a zero-velocity filter 3 and a conditional circuit 4 connected to canceller 4 and zero-velocity filter 3. Although canceller 2 and zero-velocity filter 3 are shown in singular form in the block diagram, they are in practice employed in duplicate on account of an "in phase" channel (or I-channel) and a quadrature channel (or Q-channel) contained in unit 1; in each of these channels the video signals are detected coherently and subsequently digitized. Thus the canceller denoted by reference numeral 2 consists of two digital cancellers, connected to the I- and Q-channels, and a valuation circuit connected to the two cancellers for determining the logarithm of the absolute value of the digital video signals. The same applies to the zero-velocity filter 3.

Canceller 2 is expected to fully suppress the video signals of stationary targets and to pass video signals of moving targets with less damping as the corresponding doppler frequency increases. On the other hand, the zero-velocity filter 3 is expected to pass the clutter video signals, that is, video signals from stationary targets, unattenuated. However, the zero-velocity filter 3 still passes video signals from moving targets, albeit that they are more attenuated as the associated doppler frequency increases.

The conditional circuit 4 will generate a clutter switching signal only if the signal magnitude obtained from zero-velocity filter 3 exceeds the signal magnitude obtained from canceller 2. The clutter switching signal indicates whether the doppler frequency of the video signal concerned remains below a certain value and, hence, whether the particular target must be regarded as being stationary or a slowly moving target.

From "Theory and Application of Digital Signal Processing", Prentice Hall, Inc., Englewood Cliffs, N.J., pp. 76–79, by L. R. Rabiner and B. Gold, it follows that to avoid frequency dispersion in the doppler spectrum the above filters are to possess a linear phase response and that they are to be preferably transversal and symmetric or antisymmetric.

It is obvious to employ a single or a double version of canceller 2. If the pulse radar apparatus is made to generate transmitter pulses of a fixed pulse repetition time and provided with a double canceller, the weighting factors are 1, $-2$ and 1, and the transfer function is $|H_c(\omega)| = 4 \sin^2 \frac{1}{2}\omega\tau$, where $\omega$ is the doppler frequency and $\tau$ the pulse repetition time. The 20 log value of this transfer function indicated by $|H_c(\omega)|_{dB}$ is shown in FIG. 3 by curve 5.

Since the correspondingly numbered weighting factors of the zero-velocity filter 3 and canceller 2 must be adjusted to each other in magnitude, the zero-velocity filter 3 has, as matching filter, weighting factors 1, 2 and 1. This gives the transfer function $|H_z(\omega)| = 4 \cos^2 \frac{1}{2}\omega\tau$, where the $|H_z(\omega)|_{dB}$ value is shown in FIG. 3 by curve 6. From curves 5 and 6 it can be seen that, except in a section 7 with the fixed clutter, in two areas 8 and 9 round the doppler frequencies corresponding with the blind speeds, the output signal of the zero-velocity filter 3 is greater than that of the canceller 2. Therefore, also echo signals from targets, moving with respect to the radar measuring center at a blind speed, provide a clutter switching signal. Means will be sought to prevent the generation of clutter switching signals under such conditions as much as possible. Prior to the comparison with the clutter video signal, the video signal from canceller 2 is first increased by a constant value (e.g. 12, see curve 10 in FIG. 3) to provide that the areas situated around the doppler frequencies corresponding with the blind speeds, where $|H_z(\omega)| \geq |H_c(\omega)|$ (see lines 11 and 12 in FIG. 3), have diminished considerably (about 40% in the case in question). However, the frequency area 13, which may as it were be indicated as the true clutter area, is reduced to an equal extent, but this is not contemplated. To obtain curve 10, the conditional circuit 4 in the embodiment of the pulse radar apparatus of FIG. 2, having a logarithmic gain of the video signals, comprises a revaluation circuit 14, in which the digital value of the video signal is increased by the above constant, and a comparator 15 supplied with the values produced by zero-velocity filter 3 and revaluation circuit 14. When the revaluation circuit 14 supplies the comparator 15 with a video signal greater than the applied clutter signal, comparator 15 will generate a fixed-target indication signal. In the embodiment of the pulse radar apparatus in question this indication signal can be used as clutter switching signal. Should linear gain be used instead of logarithmic gain in determining the amplitude, the revaluation circuit 14 would not be used as an adding circuit but as a multiplication circuit with a constant multiplication factor. The magnitude of the constant applied in the revaluation circuit 14 determines the magnitude of the frequency ranges, within which the doppler frequency of a video signal should be in order that with the use of a fixed target indication signal the target concerned is still identifiable to be stationary or quasi-stationary.

An effective solution to the problem of generating a fixed target indication signal for video signals at a doppler frequency related to a blind speed is not obtainable by merely increasing the magnitude of the output signal of the double canceller 2. For the periodicity in the characteristic of curve 5 does not allow an increase in this characteristic by a suitable constant in such a way that a frequency range remains exclusively for doppler frequencies of stationary or slowly moving targets, when the increased canceller response would be greater than the response of the zero-velocity filter.

An effective solution to this problem is however obtained if, in addition, the following measures are taken in combination:

the pulse radar apparatus must be suitable for generating transmitter pulses with staggered pulse repetition times;

the conditional circuit 4 must be provided with first memory means 16 connected to comparator 15 for storing the supplied fixed-target indication signals for each range quant, the period of storage corresponding with a number of successive pulse repetition times; and the conditional circuit 4 must be provided with means 17 for generating a clutter switching signal in the presence of a defined minimum number of fixed-target indication signals obtained for corresponding range quants within said period in the first memory means 16.

For a double canceller 2 and a zero-velocity filter 3 of the matching type in a pulse radar apparatus suitable for generating transmitter pulses with staggered pulse repetition times $T_1$ and $T_2$, the following transfer functions are applicable:

$$H_c(\omega) = e^o - 2e^{-j\omega T_2} + e^{-j\omega(T_1 + T_2)},$$

and $$H_z(\omega) = e^o + 2e^{-j\omega T_2} + e^{-j\omega(T_1 + T_2)}.$$

For pulse repetition times $T_1 = T(1-\epsilon)$ and $T_2 = T(1+\epsilon)$ this gives the following amplitude responses:

$$|H_c(\omega)|_{dB} = 10 \log [1 + \cos^2 \omega T - 2 \cos \omega T \cdot \cos \epsilon \omega T] + 6.02,$$

and $$|H_z(\omega)|_{dB} = 10 \log [1 + \cos^2 \omega T + 2 \cos \omega T \cdot \cos \epsilon \omega T] + 6.02,$$

where curves 18 and 19 of FIG. 4 are shown with a stagger factor $\epsilon = 0.07$. Although curves 18 and 19 are clearly distinguishable from curves 5 and 6 of FIG. 3, no difference is noticeable between the frequency ranges 7, 8 and 9 in FIG. 3, where $|H_z(\omega)| \geq |H_c(\omega)|$, and the corresponding frequency ranges 20, 21 and 22 in FIG. 4. A more favorable result is obtained by increasing the characteristic of curve 18 by 12 to produce the characteristic of curve 23. The then obtained frequency ranges 24 and 25 show however a noticeable difference with the frequency ranges 11, 12 and 13 of FIG. 3 obtained in a similar way; this is caused by the presence of the stagger factor $\epsilon$ in this function.

Figure 5:
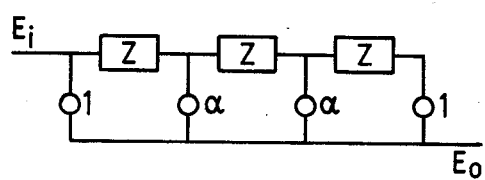
FIG. 5 is a schematic diagram of a first type symmetric, 4-point transversal filter.
Figure 6:
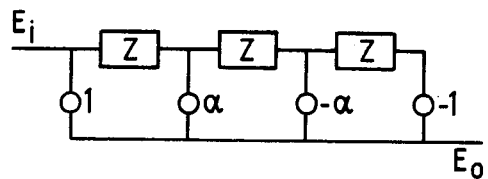
FIG. 6 is a schematic diagram of a first type antisymmetric, 4-point transversal filter.

With the use of a canceller 2 and a zero-velocity filter 3 of a higher order, namely of the non-recursive, 4-point type, it may be considered to apply in the first instance a filter with three identical delay lines Z and to introduce four weighting factors. The symmetric and antisymmetric designs of such a filter are shown in FIGS. 5 and 6, respectively. The z-transformed transfer functions of these filters are respectively:

$$E_o E_i^{-1} = z^{-3} \{z^3 + \alpha z^2 + \alpha z + 1\},$$

and $$E_o E_i^{-1} = z^{-3} \{z^3 + \alpha z^2 - \alpha z - 1\},$$

where $E_i$ and $E_o$ are the input and output signals and $\alpha$ the weighting factors still to be determined. For a canceller 2 of the type shown in FIG. 5, substitution of the root $z = 1$ in the z-transformed transfer function produces the equation: $1 + \alpha + \alpha + 1 = 0$. From this it follows that $\alpha = -1$, and the series of weighting factors 1, $-1$, $-1$ and 1. Since with such a series the value $z = -1$ also satisfies the root of the z-transformed transfer function and, hence, the minimum requirements of a zero-velocity filter, the filter type of FIG. 5 is not usable for the production of a canceller. If canceller 2 is designed as shown in FIG. 6, it is found that, after substitution of $z = 1$ in the z-transformed transfer function, the equation of coefficients is: $1 + \alpha - \alpha - 1 = 0$, satisfying for each value of $\alpha$ the requirement for a suitable canceller. Since however $\alpha = 1$ produces a root $z = -1$, giving the condition for a zero-velocity filter, the set of solutions for the design of a canceller 2 is: $\{\alpha \epsilon R/\alpha \neq 1\}$. The matching zero-velocity filter 3 should then be of the type shown in FIG. 5; substitution of $z = -1$ in the z-transformed transfer function of FIG. 5 results in: $-1 + \alpha - \alpha + 1 = 0$, which renders only the limitation $\alpha \neq -1$, since otherwise the filter obtained would also display the characteristics of a canceller.

For a proper functioning canceller a second requirement may be that the stop band of the canceller be sufficiently wide to be able to eliminate fixed clutter to a sufficient extent. The remaining roots $z_2$ and $z_3$ of the equation $z^3 + \alpha z^2 - \alpha z - 1 = 0$ should therefore be of such values that the roots corresponding therewith in the S-plane are on the $j\Omega$-axis; for the roots $z_2$ and $z_3$ this leads to the requirement: discriminant $D \leq 0$, and hence $-3 \leq \alpha \leq 1$. The value $\alpha = -3$ renders a threefold root $z = 1$; the remaining values of $\alpha$ introduce side lobes in the canceller characteristic. These side lobes are less desirable in striving for a good suppression of fixed clutter. On similar considerations the value $\alpha = -3$ renders a suitable zero-velocity filter of the type shown in FIG. 5. For this value of $\alpha$ and with a repetitive series of pulse repetition times $T_1$, $T_2$ and $T_3$, the transfer functions for canceller 2 and zero-velocity filter 3 are:

$$H_c(\omega) = e^0 - 3 \cdot e^{-j\omega T_3} + 3 \cdot e^{-j\omega(T_2 + T_3)} - e^{-j\omega(T_1 + T_2 + T_3)},$$

and $$H_z(\omega) = e^0 - 3 \cdot e^{-j\omega T_3} - 3 \cdot e^{-j\omega(T_2 + T_3)} + e^{-j\omega(T_1 + T_2 + T_3)},$$

respectively. Hence the filter amplitude responses are:

$$|H_c(\omega)|_{dB} = 10 \log \{20 - 18 \cos \omega T_2 + 6 \cos \omega(T_1 + T_2) - 6 \cos \omega T_1 - 6 \cos \omega T_3 + 6 \cos \omega(T_2 + T_3) - 2 \cos \omega(T_1 + T_2 + T_3)\},$$

and $$|H_z(\omega)|_{dB} = 10 \log \{20 + 18 \cos \omega T_2 + 6 \cos \omega(T_1 + T_2) + 6 \cos \omega T_1 + 6 \cos \omega T_3 + 6 \cos \omega(T_2 + T_3) + 2 \cos \omega(T_1 + T_2 + T_3)\},$$

respectively.

A suitable series of pulse repetition times will now be sought to obtain both for canceller 2 and zero-velocity filter 3 a series of amplitude response characteristics showing such mutual differences that the frequency ranges obtained with these characteristics assume ever-changing positions, where $|H_z(\omega)| \geq |H_c(\omega)|$. Since a changing position does not occur for the true clutter area, a suitable selection method is obtained for the presence of echo signals in the true clutter area by checking whether in a number of successive measuring procedures the clutter indication signal is generated a sufficient number of times. Only then it may be assumed with a fair amount of certainty that the doppler frequency of the detected echo signal is in the true clutter area. Important in this connection is that a good choice of the pulse repetition time in the trigonometric term having the largest coefficient, that is the term 18 cos $\omega T_2$, has a favourable effect on the intended stagger in positions of frequency ranges, where $|H_z(\omega)| \geq |H_c(\omega)|$. A suitable series of pulse repetition times is: $\{T(1-\epsilon), T(1+\epsilon), T(1-\epsilon), \text{etc.} \ldots \}$.

Figure 9:
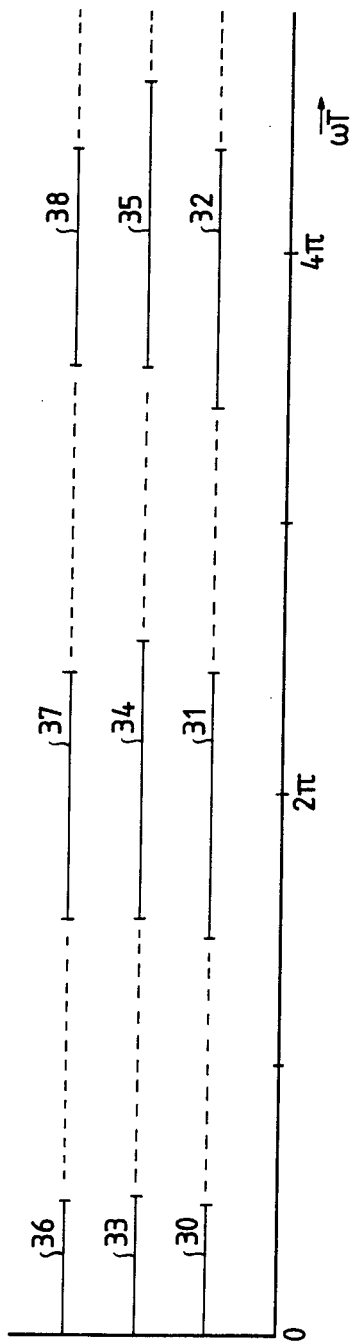
FIGS. 9 and 10 show a number of diagrams with respect to the frequency ranges determined in FIGS. 7 and 8 with $|H_z(\omega)| \geq |H_c(\omega)|$.
Figure 10:
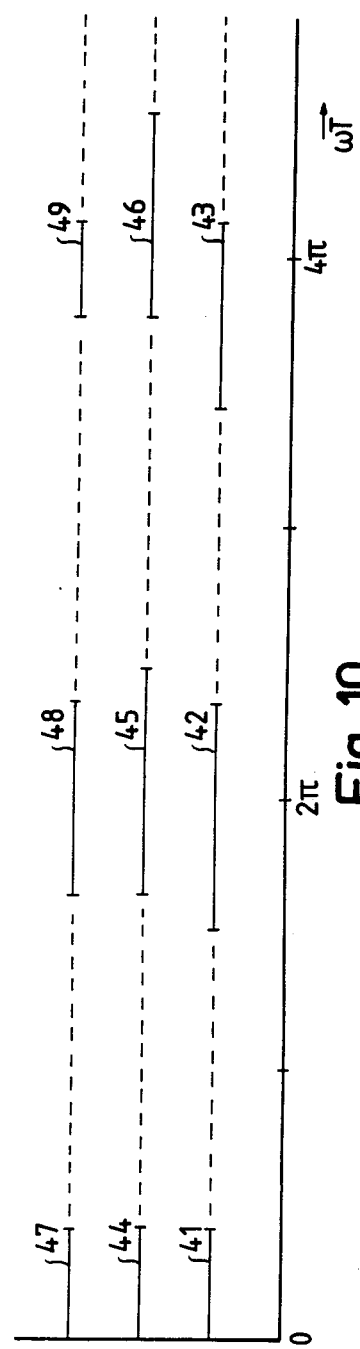

The amplitude response functions for this series of pulse repetition times are:

$$|H_c(\omega)|_{dB} = 10 \log \{20 - 18 \cos \omega T(1 \pm \epsilon) + 12 \cos 2\omega T - 12 \cos \omega T(1 \mp \epsilon) - 2 \cos \omega T(3 \mp \epsilon)\}$$

for canceller 2, and $$|H_z(\omega)|_{dB} = 10 \log \{20 + 18 \cos \omega T(1 \pm \epsilon) + 12 \cos 2\omega T + 12 \cos \omega T(1 \mp \epsilon) + 2 \cos \omega T(3 \mp \epsilon)\}$$

for zero-velocity filter 3, where the series of pulse repetition times is $T(1-\epsilon)$, $T(1+\epsilon)$, $T(1-\epsilon)$, and $T(1+\epsilon)$, $T(1-\epsilon)$, $T(1+\epsilon)$, respectively. For $\epsilon = 0.07$, the characteristics of canceller 2 and zero-velocity filter 3, to be compared with each other at the same time, are shown in FIGS. 7 and 8 by reference numerals 26, 27 and 28, 29, respectively. It is seen that the frequency ranges 30, 31 and 32 in FIG. 7 and 33, 34 and 35 in FIG. 8, where $|H_z(\omega)| \geq |H_c(\omega)|$, show slight differences. The frequency ranges 30–35 are shown collectively in FIG. 9, enabling the formation of a separate diagram of the frequency ranges with reference numerals 36, 37 and 38, which represent the overlapping parts of the frequency ranges 30–35. If the canceller chracteristics 26 and 28 in FIGS. 7 and 8 are increased by a constant 12, to produce characteristics 39 and 40 respectively, clear differences arise in the positions in the then obtained frequency ranges 41–46, where $|H_z(\omega)| \geq |H_c(\omega)|$, especially with respect to the second blind speed range. FIG. 10 illustrates a diagram of the frequency ranges 41–46 and 47–49 obtained with the overlapping. A comparison of the frequency ranges 48 and 49 with 37 and 38 in FIG. 9 shows that, on account of the applied increase of the canceller characteristics of curves 26 and 28, the extent of the frequency ranges associated with the blind speeds and defined by $|H_z(\omega)| \geq |H_c(\omega)|$, is reduced by about 35%. A slight increase of applied constant would render an even more favourable result, which is permissible in view of the increased slope of these characteristics in comparison with those of FIG. 4. A similar deduction may be made for other series of pulse repetition times, which are left out of discussion.

Figure 11:
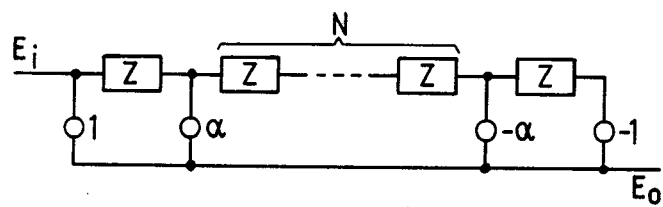
FIG. 11 is a schematic diagram of a second type anti-symmetric, 4-point transversal filter.
Figure 12:
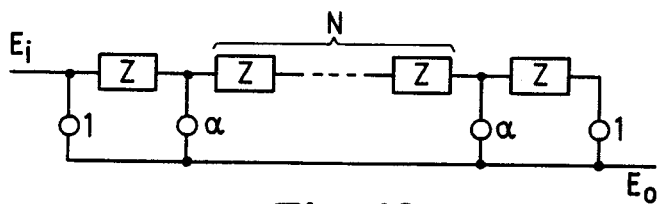
FIG. 12 illustrates a schematic diagram of a second type symmetric, 4-point transversal filter.

It will be further examined whether the intended result is also obtained with the application of the transversal filters of FIGS. 11 and 12, having four delay lines (N=2) and four weighting factors. With such a 4-point filter type it is necessary to make one weighting factor 0, resulting in the absence of a branch between the third and fourth delay lines through the required symmetric or anti-symmetric construction of the filter.

In case the canceller 2 is of the anti-symmetric configuration of FIG. 11, the z-transformed transfer function $E_o.E_i^{-1} = z^{-4}\{z^4 + \alpha z^3 - \alpha z - 1\}$ should have a root $z=1$; this is possible for each value of $\alpha$. Unfortunately, for each value of $\alpha$, $z=-1$ is a root of this transfer function as well, making the filter in this configuration unsuitable for use as a canceller or as a zero-velocity filter. For canceller 2 the application of the filter in FIG. 12 with four delay lines (N=2) and four weighting factors gives the z-transformed transfer function $E_o.E_i^{-1} = z^{-4}\{z^4 + \alpha z^3 + \alpha z + 1\}$ and the condition for the weighting factors $\alpha = -1$. However, the then obtained transfer function may be resolved into $E_i = z^{-3}.(z-1).(z^3-1)$, with the roots $$z = e^{j\frac{2k\pi}{3}}$$

where $k \in N$. This results in a faster succession of the frequency ranges characterized by the blind speeds, making this type of filter unsuitable for application as canceller. For similar reasons, the filter of FIG. 12 with four delay lines (N=2) and four weighting factors is not applicable as zero-velocity filter.

The application of the filter type in FIG. 11, having a larger number of delay lines (N>2) to obtain a canceller 2, does not impose a limiting condition for $\alpha$ with the substitution of $z=1$ in the z-transformed transfer function $E_o.E_i^{-1} = z^{-(N+2)}\{z^{N+2} + \alpha z^{N+1} - \alpha z - 1\}$. Substitution of the root $z=-1$ in this transfer function however results in the condition $\alpha = 1$ or N is an even value; therefore, the following limitation must be introduced for the canceller: $\alpha \neq 1$ and N is an odd value. The requirement that the z-transformed transfer function is to contain a second root $z=1$ results in another condition: $\alpha = -1 - 2.N^{-1}$. For N=1, a situation is obtained as described with reference to FIGS. 5–10, while the remaining, odd values of N render a still smaller value of $\alpha$, so that none of the terms can fulfill a dominating part in forming a filter amplitude response. This leaves out the possibility of obtaining a variation in the response characteristics using one term and a series of suitably selected pulse repetition times, and, hence, a variation in the position of the frequency ranges, defined by $|H_z(\omega)| \geq |H_c(\omega)|$. Therefore, the filter type of FIG. 11, where N>2, is not suitable for the construction of a canceller 2, nor is the filter type of FIG. 12, where N>2, to function as zero-velocity filter 3.

Application of the filter type in FIG. 12, having a larger number of delay lines (N>2) for obtaining a canceller 2, renders, without change, the condition $\alpha = -1$, and is therefore unsuitable. For the same reason, the filter type of FIG. 11, where N>2, is not suited for the construction of a zero-velocity filter 3.

Figure 13:
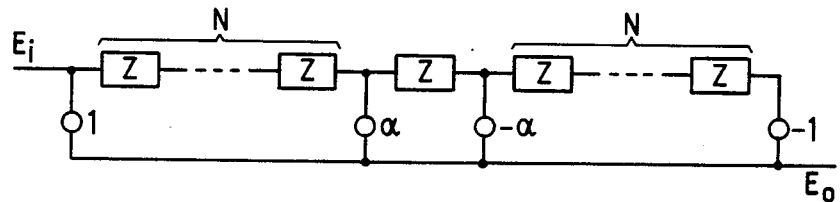
FIG. 13 is a schematic diagram of a third type anti-symmetric, 4-point transversal filter.
Figure 14:
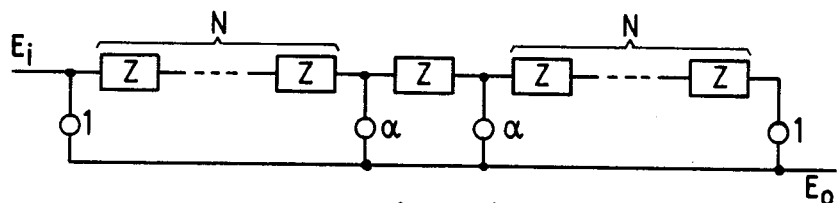
FIG. 14 is a schematic diagram of a third type symmetric, 4-point transversal filter.

Application of the filter of FIG. 13, being of the antisymmetric type, where N=2, that is with five delay lines and four actual weighting factors for obtaining a canceller 2, gives the following z-transformed transfer function: $E_o.E_i^{-1} = z^{-5}\{z^5 + \alpha z^3 - \alpha z^2 - 1\}$. The requirement of a double root $z=1$ (thus giving a threefold root $z=1$) results in the condition $\alpha = -5$, which is acceptable since $z=-1$ is not a root of this equation. A matching zero-velocity filter 3 is obtained with a symmetric filter type as shown in FIG. 14, comprising five delay lines (N=2) and four actual weighting factors, where $\alpha$ must equal $-5$. With the series of pulse repetition times $T_1$, $T_2$, $T_3$, $T_4$ and $T_5$, the respective filter transfer functions obtained for canceller 2 and zero-velocity filter 3 are:

$$H_c(\omega) = e^0 - 5.e^{-j\omega(T_4+T_5)} + 5.e^{-j\omega(T_3+T_4+T_5)} - e^{-j\omega(T_1+T_2+T_3+T_4+T_5)}$$

and $$H_z(\omega) = e^0 - 5.e^{-j\omega(T_4+T_5)} - 5.e^{-j\omega(T_3+T_4+T_5)} + e^{-j\omega(T_1+T_2+T_3+T_4+T_5)}$$

associated with the filter amplitude responses:

$$|H_c(\omega)|_{dB} = 10 \log \{52 - 10 \cos \omega(T_4+T_5) + 10 \cos \omega(T_3+T_4+T_5) - 2 \cos \omega(T_1+T_2+T_3+T_4+T_5) - 50 \cos \omega T_3 + 10 \cos \omega(T_1+T_2+T_3) - 10 \cos \omega(T_1+T_2)\}$$

and $$|H_z(\omega)|_{dB} = 10 \log \{52 - 10 \cos \omega(T_4+T_5) - 10 \cos \omega(T_3+T_4+T_5) - 2 \cos \omega(T_1+T_2+T_3+T_4+T_5) + 50 \cos \omega T_3 + 10 \cos \omega(T_1+T_2+T_3) + 10 \cos \omega(T_1+T_2)\}.$$

These functions clearly show the importance of the term $\pm 50 \cos \omega T_3$. By having a large variation of the value of $T_3$ in each case, a continuous shift of the frequency ranges is obtained, where $|H_z(\omega)| \geq |H_c(\omega)|$. This enables to make a distinction between fixed clutter returns and returns from moving targets.

Figure 19:
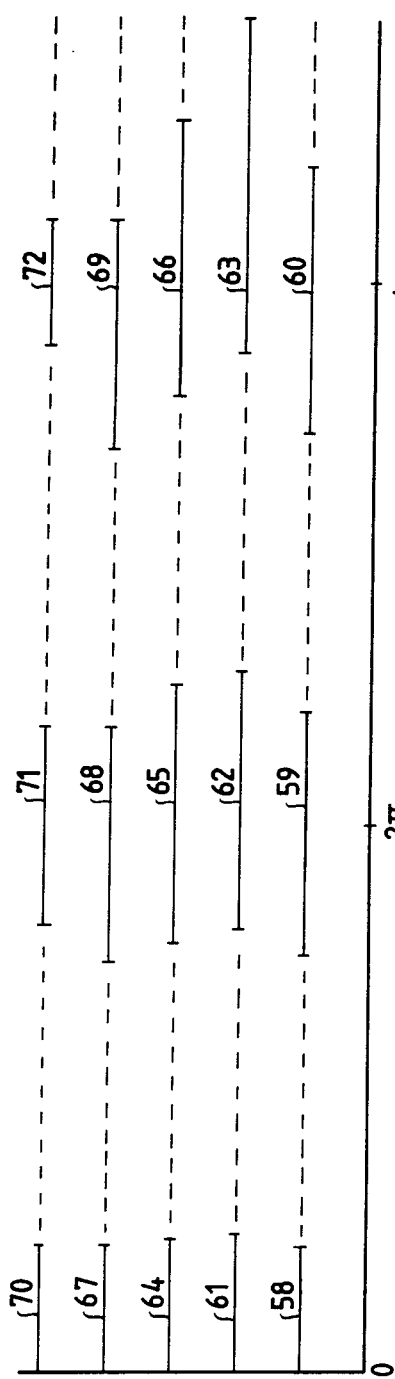
FIGS. 19 and 20 show a number of diagrams with respect to the frequency ranges determined in FIGS. 15 to 18 with $|H_z(\omega)| \geq |H_c(\omega)|$.
Figure 20:
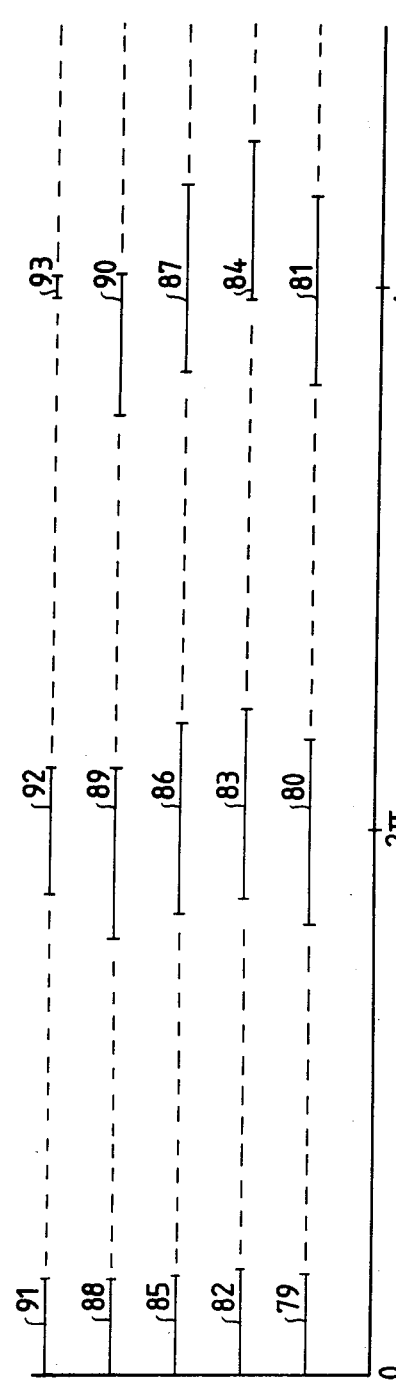
Figure 23:
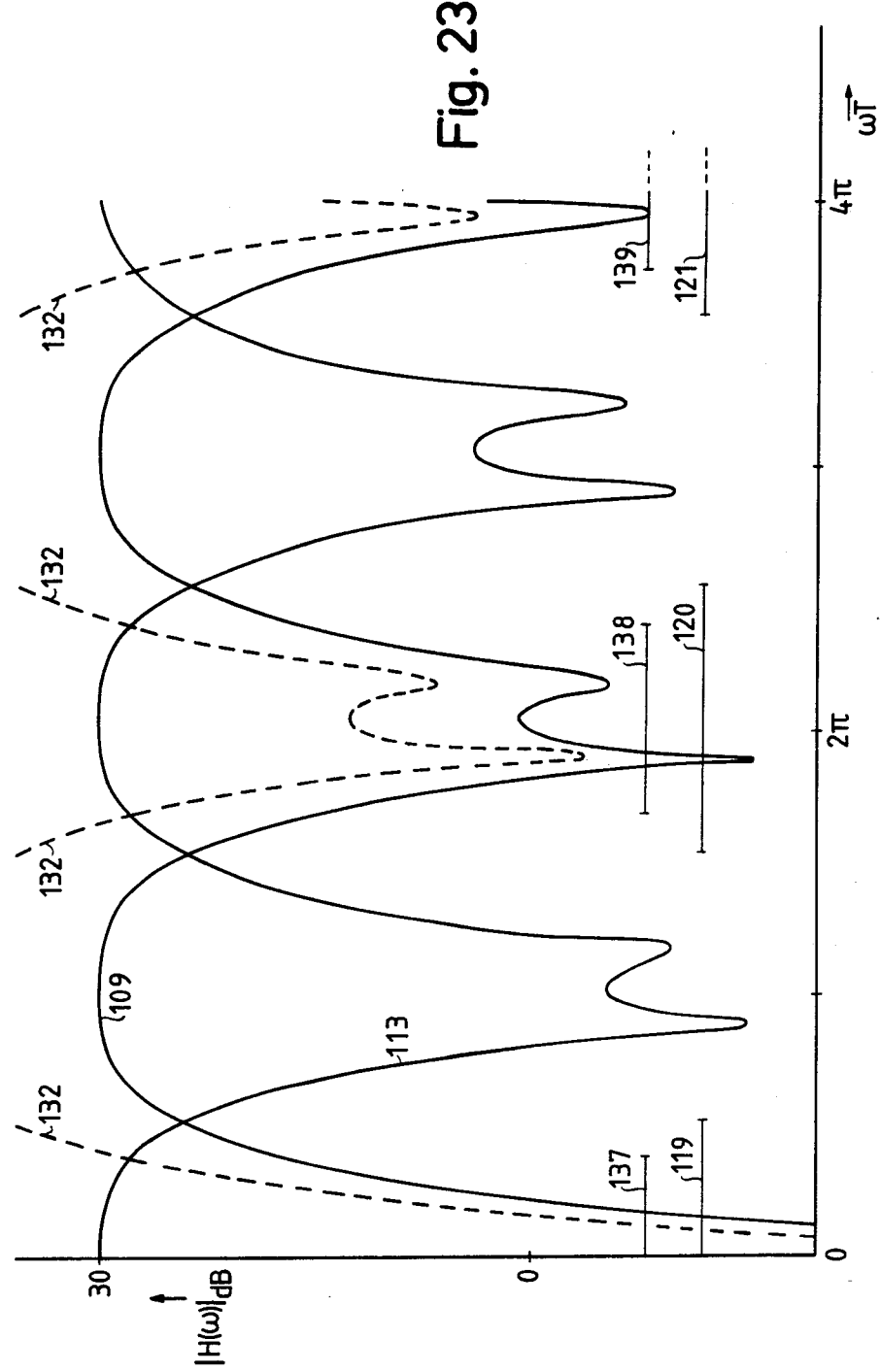
Figure 24:
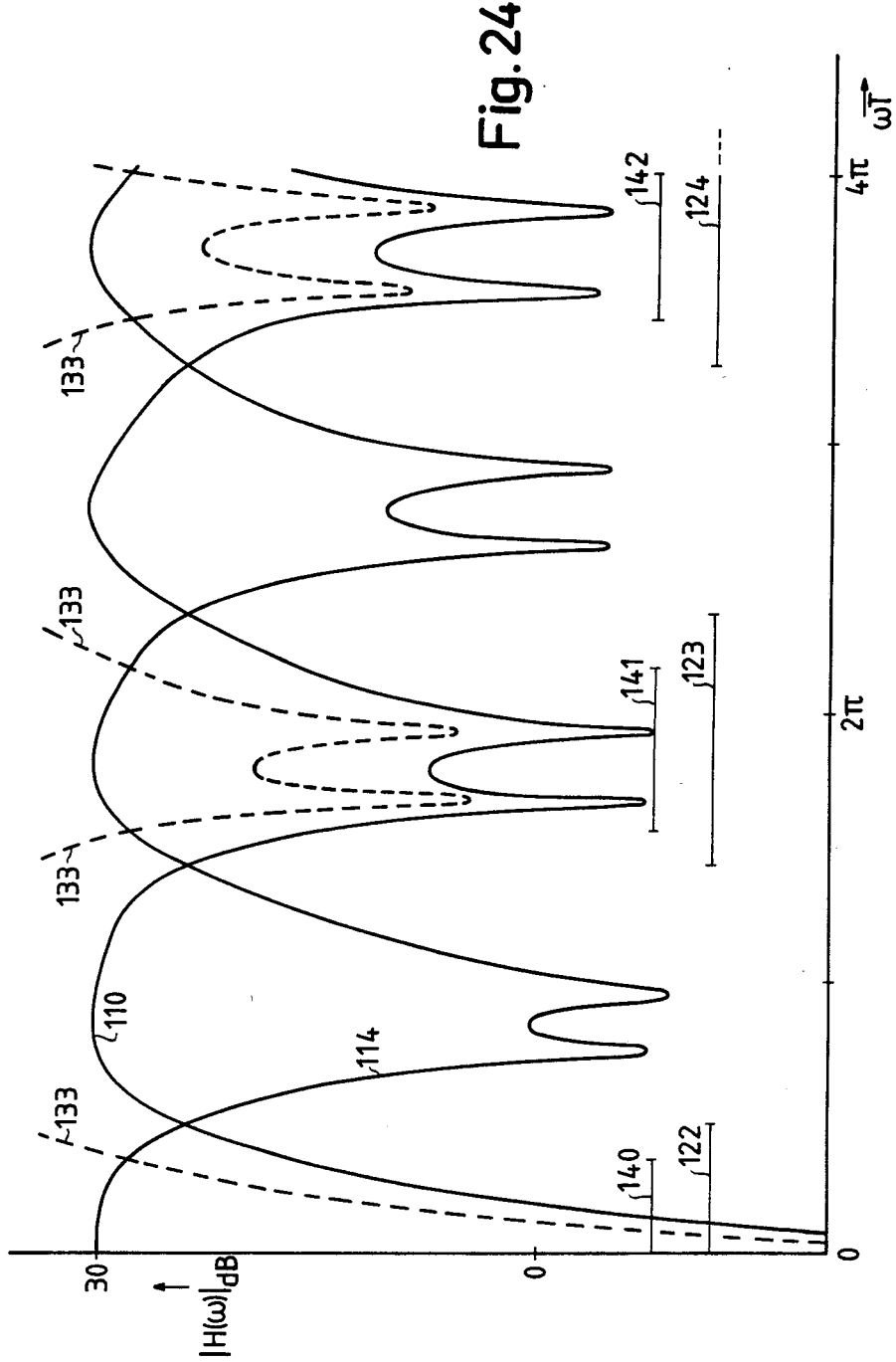
Figure 25:
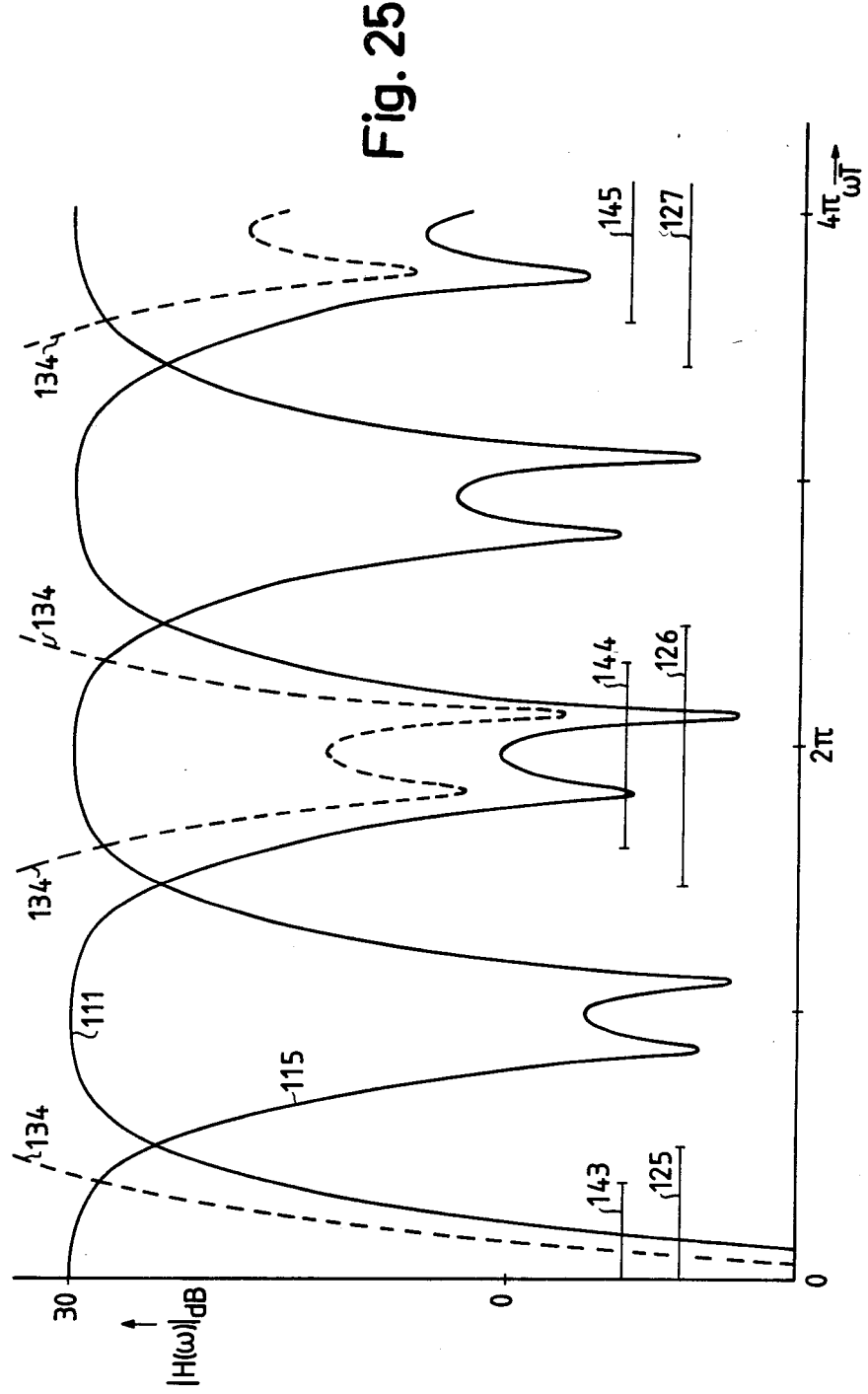

Of the applicable series of pulse repetition times, one series will be discussed. This series is found to be suitable for obtaining a special embodiment of a pulse radar apparatus according to the invention. The contemplated series of pulse repetition times may be represented by: T, $T(1+\epsilon_1)$, $T(1-\epsilon_1)$, T, $T(1+\epsilon_2)$, $T(1-\epsilon_2)$, etc., where for the embodiment in question:

$$\epsilon_1 = \epsilon_{4N+1} = -0.07$$

$$\epsilon_2 = \epsilon_{4N+2} = -0.03$$

$$\epsilon_3 = \epsilon_{4N+3} = 0.07$$

$$\epsilon_4 = \epsilon_{4N+4} = 0.03$$

for each natural number H. In this embodiment the pulse repetition times $T_1$, $T_2$, $T_3$, $T_4$ and $T_5$ correspond with T, $T(1-\epsilon_i)$, $T(1-\epsilon_i)$, T, $T(1-\epsilon_{i+1})$, where i∈N, while only during the pulse repetition times $T(1+\epsilon_i)$ the filter output values are extracted from canceller 2 and zero-velocity filter 3 and applied to the conditional circuit 4. The canceller characteristics applicable during four successive pulse repetition times of the $T(1+\epsilon_i)$ type, and the corresponding zero-velocity characteristics are shown in FIGS. 15-18 and denoted by reference numerals 50-53 and 54-57, respectively. The frequency ranges 58-60, 61-63, 64-66 and 67-69, defined by $|H_z(\omega)| \geq |H_c(\omega)|$ in these figures are shown collectively in FIG. 19 to be able to correctly establish the overlapping parts 70-72 as well. It can now be assumed that when in four successive pulse repetition times of the $T(1+\epsilon_i)$ type the same number of fixed-target indication signals are generated, the respective video sigbal has a doppler frequency in one of the ranges 70-72, so that a clutter switching signal can be generated. For this purpose the first memory means 16 could function as a combination of a 3-bit shift register 73 and a 4-bit register 74. The 4-bit register 74 then receives, if present, a fixed-target indication signal from comparator 15, and, from shift register 73, the fixed-target indication signals connected with the same range quant and obtained in the last three pulse repetition times of the $T(1+\epsilon_i)$ type. Means 17 connected to register 74 also receive the four signals supplied to register 74. With the supply of four fixed-target indication signals, means 17 will generate the clutter switching signal. Of each four fixed-target indication signals the three last generated signals are supplied to register 73. It should be noted that in practice each fixed target is illuminated first by the edge portion of the radar antenna beam; it may then be that the echo received from such a target is wrongly taken to be a weak signal, and will not result in a fixed target indication signal. The same situation arises when the fixed target comes again outside the antenna beam. A feasible solution of obviating such a loss of a fixed-target indication signal consists in augmenting the capacity of register 74 to eight bits, that of register 73 to seven bits and designing the means 17 as to generate a clutter switching signal with the presence of six or seven fixed-target indication signals instead of the eight possible signals. A considerable reduction of the frequency ranges 71 and 72 (FIG. 19), to be referred to as quasi-clutter areas, is obtained by raising the canceller characteristics of FIGS. 15 to 18 by a constant, say 12, resulting in the characteristics 75-78. The then obtained frequency ranges, defined by $|H_z(\omega)| \geq |H_c(\omega)|$, are designated by 79-81, 82-84, 85-87 and 88-90. These frequence ranges are shown collectively in FIG. 20 to establish the overlapping parts 91-93 of frequency ranges 79-90. A comparison of the frequency ranges 91-93 with 68-70 again shows that the raising of the canceller characteristics considerably reduces the quasi-clutter areas, whereby the clutter switching signal is generated.

Figure 21:
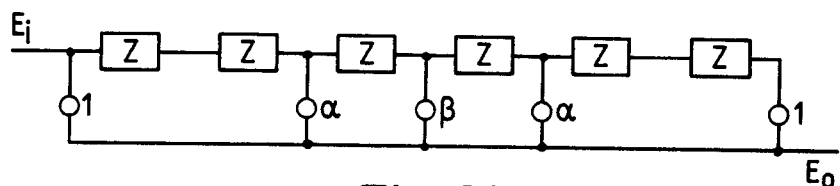
FIG. 21 is a schematic diagram of a 5-point transversal filter.
Figure 16:
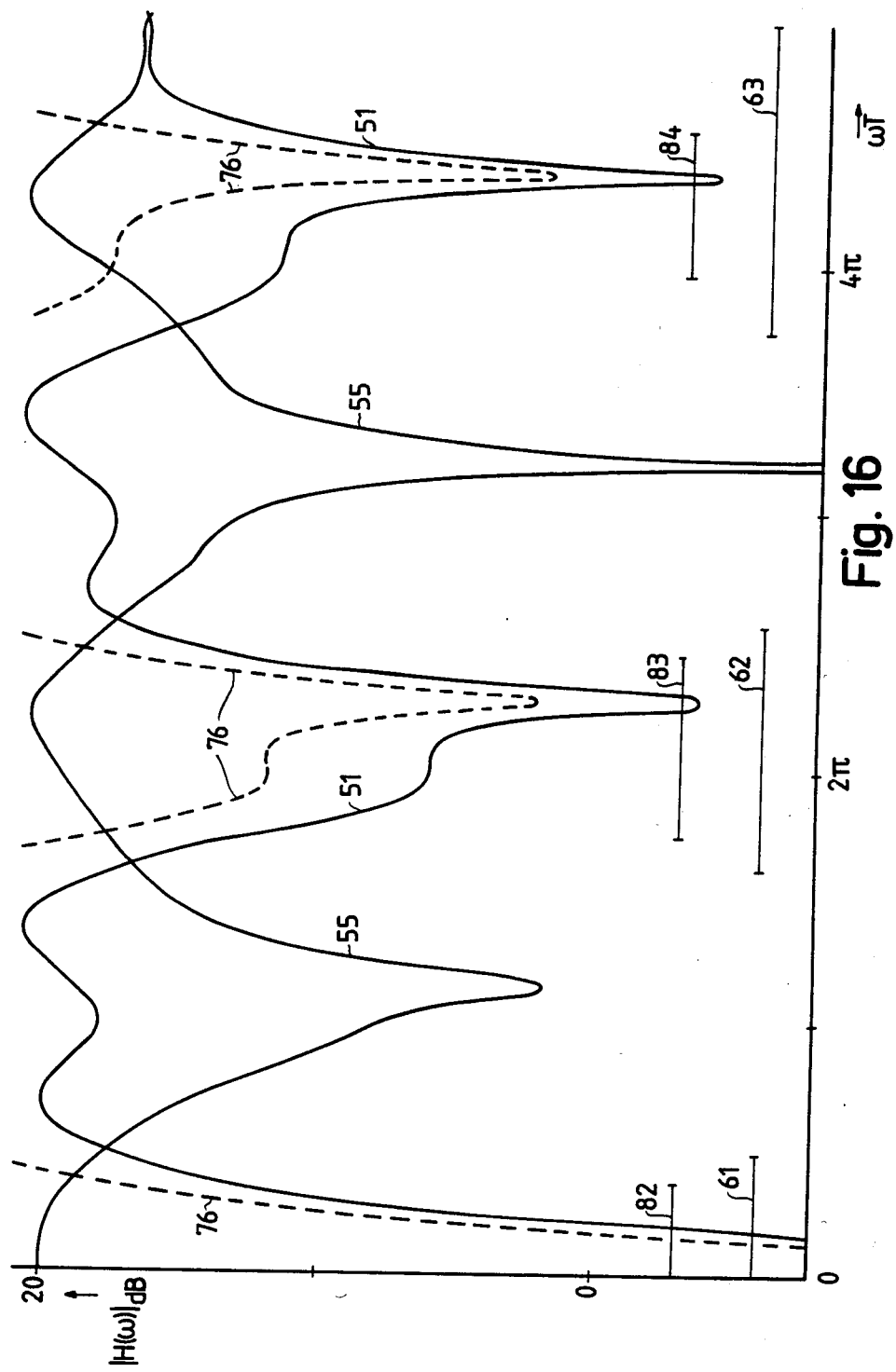
Figure 17:
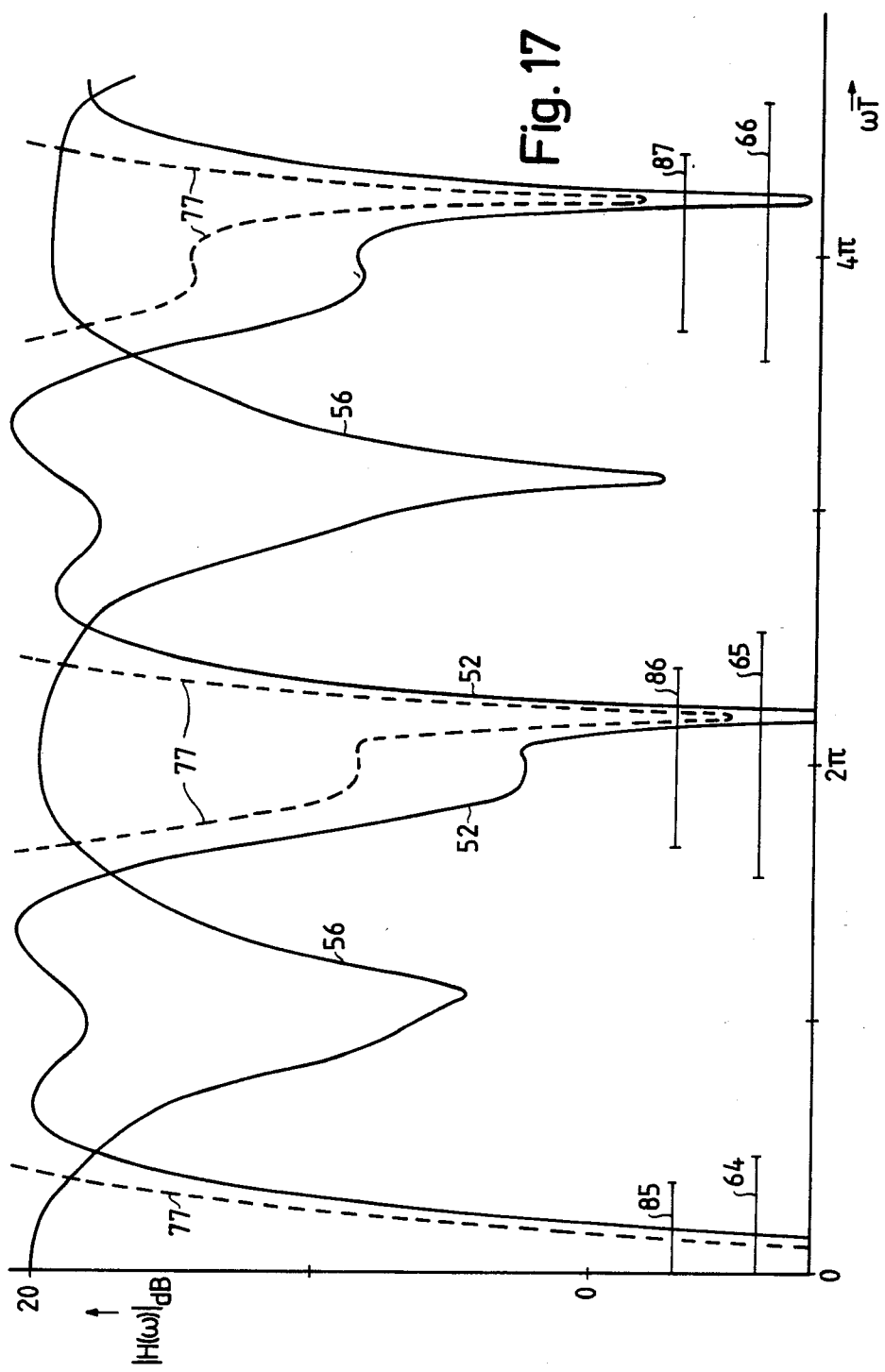
Figure 18:
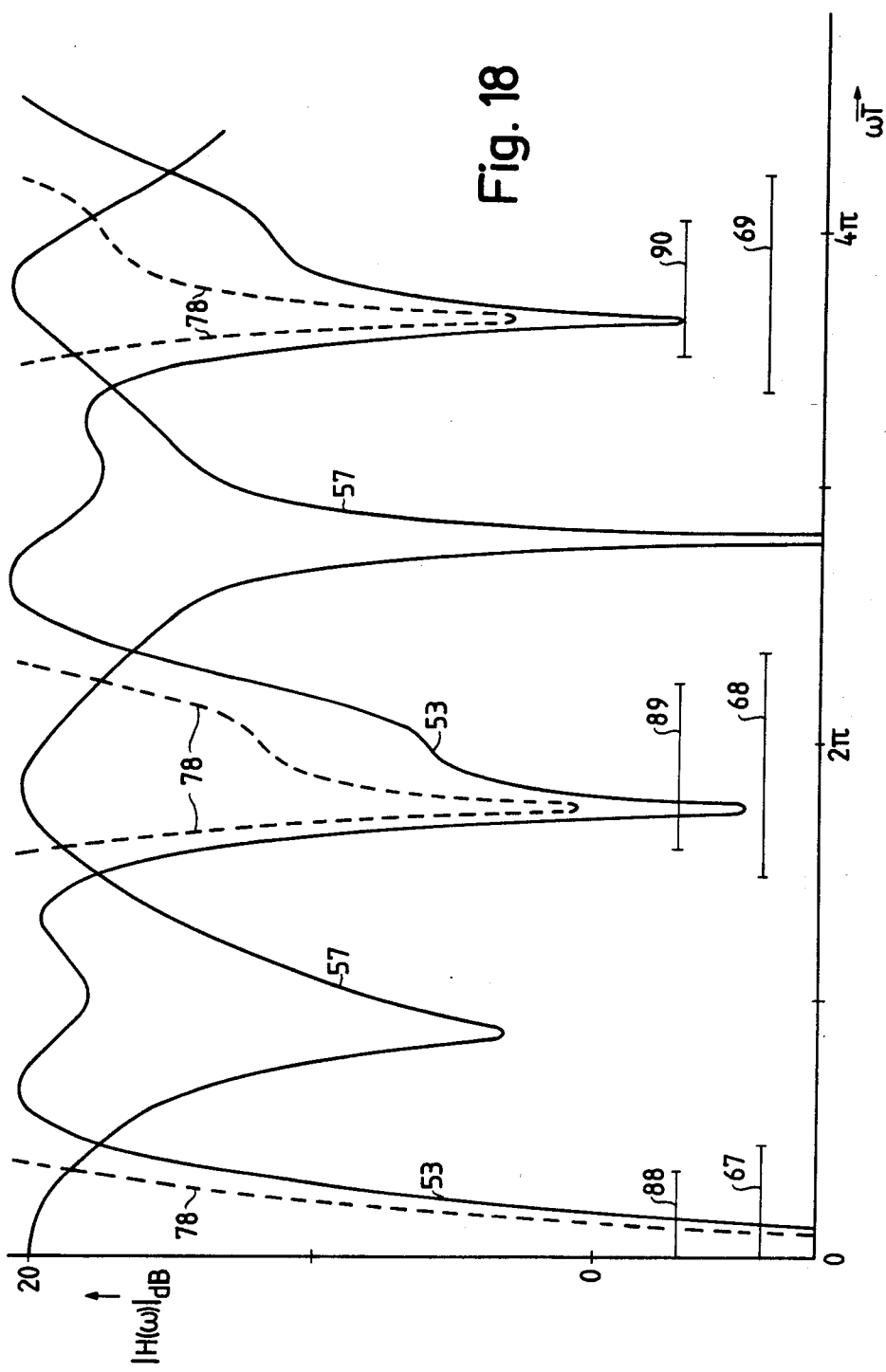

Apart from the filter types already described, it is also possible to apply filter types where the number (L) of weighting factors is greater than 4, and the number (M) of delay lines is given by L≦M. A feasible embodiment of such a filter type is shown in FIG. 21, where the number of delay lines is equal to 6 and the number of weighting factors to 5.

The clutter switching signal now permits control of a switching gate to deliver unambiguous echo signals from moving and fixed targets, respectively, upon the supply of the output signal of canceller 2 or of zero-velocity filter 3.

The clutter switching signal may be used with advantage in producting a "clutter map" by the clutter level indication means, also called an area MTI circuit 94, accommodated in the MTI video processing unit. The area MTI circuit 94 is designed to detect moving targets and to compose a clutter map for these targets which, due to a small doppler speed (such as slowly moving targets and targets flying past at a distance) or a blind speed, give insufficient response in a canceller. From the available clutter video signals of several antenna revolution periods, the area MTI circuit 94 establishes statistically a clutter level which is however adjusted each antenna revolution period. If the zero-velocity filter 3 produces a clutter video signal which exceeds, to a considerable extent, the clutter level of the cell belonging to the clutter video signal, it will be obvious that it concerns a target flying at a blind speed, flying past at a distance, or flying slowly. To produce the above clutter map for the area MTI circuit 94, a measure will be established per clutter cell for the clutter present using the available clutter video signals acquired in the presence of the clutter switching signals. Therefore, in the embodiment in question, the statistic average value of the clutter video signals available per antenna revolution in each clutter cell in the presence of the clutter switching signals will be determined over a number of antenna revolutions. To obtain the statistic average value, the MTI video processing unit in this embodiment comprises a combination circuit 95 for establishing in each clutter cell and each antenna revolution the maximum value of the clutter video signals available during the clutter switching signals, which maximum value is indicative of the temporary clutter level. The area MTI circuit 94 is further provided with a recursive filter 96 for adapting a pre-established standard or filtered clutter level by means of a temporary clutter level value supplied by combination circuit 95, and with second memory means 97, referred to as clutter memory, for storing and supplying the valid standard clutter levels for the clutter cells. Instead of the above maximum value, another value could be used as temporary clutter level.

In the embodiment in question the combination circuit 95 comprises selection means 98 and third memory means 99. Memory means 99 are capable of storing, each antenna revolution, the maximum value of the clutter video signals obtained with selection means 98 in each of the clutter cells, which maximum value is hereinafter referred to as temporary cell clutter level, while selection means 98 supply third memory means 99 with a clutter video signal if the level of this signal exceeds the pre-generated temporary clutter level of the relevant clutter cell in the presence of the clutter switching signal.

A feasible embodiment of selection means 98 is obtained with the combination of a comparator 100, an AND gate 101 and a switching gate 102. Comparator 100 receives an available clutter video signal from zero-velocity filter 3 and a pre-generated temporary clutter level value from memory means 99, and produces a logic switching signal when the supplied clutter video signal exceeds the available clutter level. In the presence of the logic switching signal from comparator 100 and a clutter switching signal from conditional circuit 4, AND gate 101 will generate a gate switching signal for switching gate 102 to pass the available clutter signal to third memory means 99 via a register 103. In case AND gate 101 fails to produce a gate switching signal, memory means 99 will receive the valid temporary clutter level value through switching gate 102 for renewed storage.

For the supply of temporary clutter level values to comparator 100 and switching gate 102, also during the first range quant of each radar scan falling within a clutter cell, the combination circuit 95 comprises a three-position switch 105 operated by the timing unit 104 of the radar apparatus. The functions of switch 105 may be described as follows:

With the first range quant of the first radar scan within the clutter cell, switch 105 is in position A for passing a 0-value to comparator 100 and switching gate 102 since at that instant no temporary clutter level value is available;

with the first range quant of the remaining scans within the clutter cell, only the third memory means 99 contains a temporary clutter level value, which is supplied to comparator 100 and switching gate 102 via switch 105, being in position B at this instant.

For the remaining range quants of the radar scans falling within the clutter cell, temporary clutter level values are available in register 103, which stores each supplied value for a period of one range quant. The three position switch 105 is now in position C to pass the value stored in register 103 to comparator 100 and switching gate 102.

The recursive filter 96 receives the valid temporary clutter level value (x) of the combination circuit 95 and the standard clutter lever value (y*) established in the previous antenna revolution and stored in clutter memory 97. In filter 96 the new standard clutter level (y) is established in accordance with the formula: $y = ax + (1-a)y^*$, where $0 < a \leq 1$, which value of y is subsequently stored in clutter memory 97.

Although for small values of a, a reliable clutter map is obtained in clutter memory 97, such a value of a is associated with a long settling procedure. It is therefore desirable to accelerate the settling procedure; this is achieved by making $a = 1$ for the first antenna revolution period, and by decreasing the value of a successively during the subsequent antenna revolution periods until the desired final value $a = a_{min}$, which is reached after a number of 1/a antenna revolutions. With normal rounding off in the calculation of y, the standard clutter level of a clutter cell will assume a new value only if the difference between the temporary clutter level x and the standard clutter level supplied by clutter memory 97 is greater than 1/2a as absolute value, implying that the filter 96 responds poorly to small changes of the temporary clutter level. To prevent this, the recursive filter 96 is designed to establish per clutter cell a weighted clutter level y according to the formulas: $y = y^* + a(x - y^*) - \beta + 1$, if $x \geq y^*$, and $y = y^* + a(x - y^*) - \beta$, for $x < y^*$, where $\beta$ is a selectable value. Recursive filter 96 with a selectable value of $\beta$ is simply realized by making $\beta - 1$. The values of y determined by filter 96 are supplied as standard clutter levels for storage in second memory means 97.

A threshold circuit 106 receives the clutter video levels from zero-velocity filter 3 and the standard clutter level of the respective clutter cell from circuit 94. Only in case the clutter video level exceeds the standard clutter level, the threshold circuit 106 produces a threshold video signal in excess of the threshold and equal to the different between the clutter video level and the standard clutter level. This difference value is representative of a target having a small doppler speed or moving at a blind speed. Instead of using the standard clutter level in the threshold circuit 106, it is possible to employ a modified standard clutter level obtainded by increasing the standard clutter level by a constant.

Finally it is possible to connect the output of the canceller 2 and the threshold circuit 106 to a video selection circuit 107, which passes the larger of the two simultaneously applied signal levels representative of the moving target then present.

The aforementioned special application of the invention with the filters of FIGS. 13 and 14, where $N = 1$, is obtained with an integrated radar system having a first pulse radar apparatus according to the invention and a second radar apparatus of another type, whereby between each two successively generated transmitter pulses of the second pulse radar apparatus two transmitter pulses of the first pulse radar apparatus are generated, and whereby only the video signals with the transmitter pulses of the first pulse radar apparatus are supplied to canceller 2 and zero-velocity filter 3. The first pulse radar apparatus may be suitable for generating transmitter pulses of relatively short duration, while the second pulse radar apparatus may be suitable for generating transmitter pulses of relatively long duration. Apart from delays in the radar system, only in each time interval between two successive transmitter pulses of the first pulse radar apparatus the conditional circuit 4 extracts output signals from canceller 2 and zero-velocity filter 3.

The use of long transmitter pulses in the second pulse radar apparatus operating in accordance with the pulse compression technique does not permit that period between the generation of the long transmitter pulse and that of the next short transmitter pulse be adjustable, as the generation of the short pulse requires the receiver to be cut off. Such an adjustable period would show an amplitude dip in the signal reception at ever changing distances; after filtering this would result in an undesirable MTI video signal in the presence of ground clutter.

Figure 26:
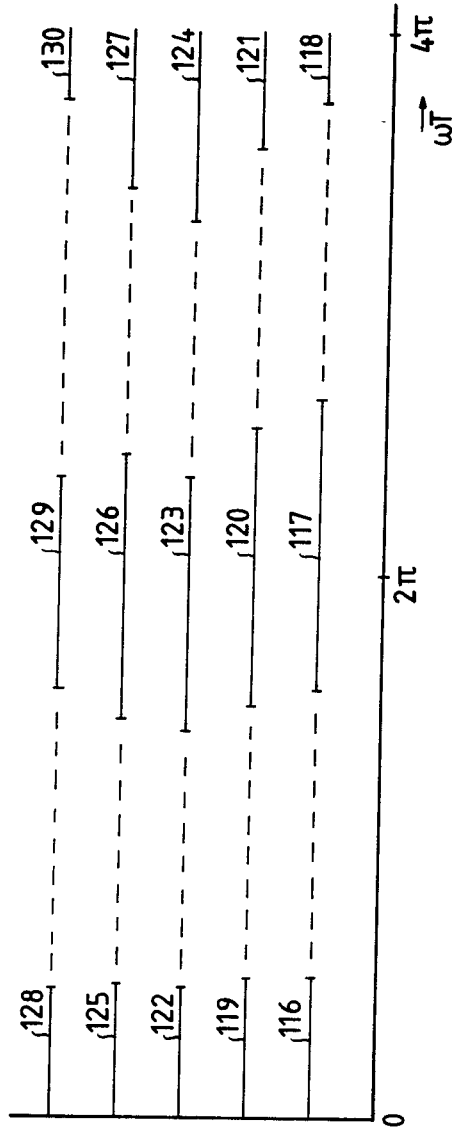
FIGS. 26 and 27 show a number of diagrams with respect to the frequency ranges depicted in FIGS. 22 to 25 with $|H_z(\omega)| \geq H_c(\omega)|$.
Figure 27:
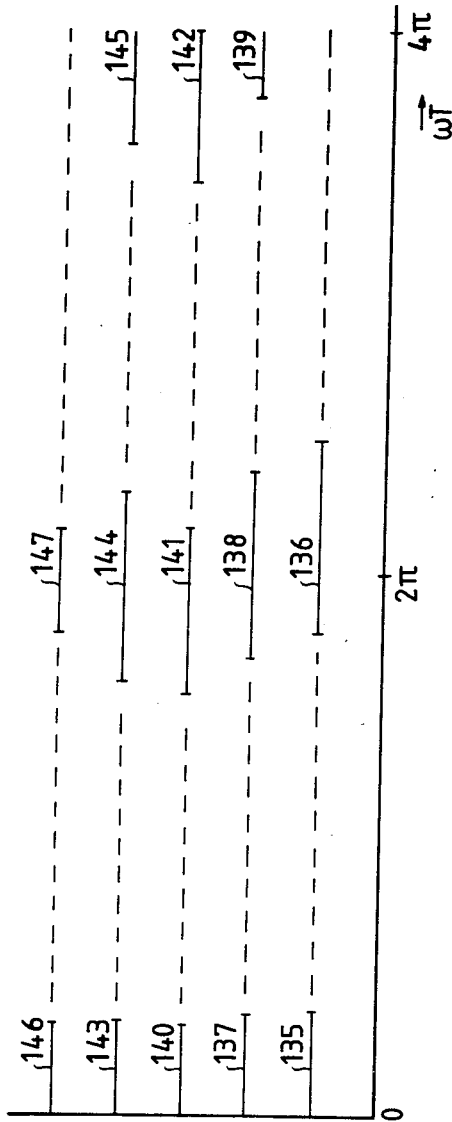

If the first pulse radar apparatus generates k transmitter pulses (where $k \geq 3$) between each two successively generated transmitter pulses of the second pulse radar apparatus, the filters applied should be adapted accordingly. In the central part or in the flank parts of such a filter a series of k successively arranged weighting factors would then be available. For $k = 3$, a feasible embodiment of a matching filter of the symmetric type is shown in FIG. 21. From the z-transformed transfer function: $E_o \cdot E_i^{-1} = z^{-6}\{z^6 + \alpha z^4 + \beta z^3 + \alpha z^2 + 1\}$ it follows that $\alpha = -9$ and $\beta = 16$ for the canceller and $\alpha = -9$ and $\beta = -16$ for the zero-velocity filter. The associated filter amplitude responses are:

$|H_c(\omega)|_{dB} = 10 \log \{420 - 18 \cos \omega(T_5 + T_6) + 32 \cos \omega(T_4 + T_5 T_6) - 18 \cos \omega(T_3 + T_4 + T_5 + T_6) + 2 \cos \omega(T_1 + T_2 + T_3 + T_4 + T_5 + T_6) - 288 \cos \omega T_4 + 162$ $\cos \omega(T_3+T_4)+18 \cos \omega(T_1+T_2+T_3+T_4)-288$
$\cos \omega T_3 + 32 \cos \omega(T_1+T_2+T_3) - 18 \cos$
$\omega(T_1+T_2)\}$, and $|H_z(\omega)|_{dB} = 10 \log \{240 - 18 \cos \omega(T_5+T_6) - 32 \cos$
$\omega(T_4+T_5+T_6) - 18 \cos \omega(T_3+T_4+T_5+T_6) + 2$
$\cos \omega(T_1+T_2+T_3+T_4+T_5+T_6) + 288 \cos$
$\omega T_4 + 162 \cos \omega(T_3+T_4) - 18 \cos$
$\omega(T_1+T_2+T_3+T_4) + 288 \cos \omega T_3 - 32 \cos$
$\omega(T_1+T_2+T_3) - 18 \cos \omega(T_1+T_2)\}.$ A suitable series of pulse repetition time is:
T, T(1+ε₁), T(1+ε₁), T(1−2ε₁), T, T(1+ε₂), T(1+ε₂), T(1−2ε₁), etc.,
where in the embodiment in question:

$\epsilon_1 = \epsilon_{4N+1} = -0.07$ $\epsilon_2 = \epsilon_{4N+2} = -0.02$ $\epsilon_3 = \epsilon_{4N+3} = 0.07$ $\epsilon_4 = \epsilon_{4N+4} = 0.02$ for each natural number N. In this embodiment the pulse repetition times T₁, T₂, T₃, T₄, T₅ and T₆ correspond with T(1−2ε_i), T, T(1+ε_{i+1}), T(1+ε_{i+1}), T(1−2ε_{i+1}), T, where i ∈ N, while only during pulse repetition time T(1+ε_{i+2}) the conditional circuit 4 extracts the filter output values from canceller 2 and zero-velocity filter 3. The canceller characteristics applicable during four successive pulse repetition times of the type T(1+ε_i) and the corresponding zero-velocity characteristics are shown in FIGS. 22-25 and denoted by reference numerals 108-111 and 112-115, respectively. The frequency ranges 116-118, 119-121, 122-124 and 125-127 to be established in these figures, where $|H_z(\omega)| \geq |H_c(\omega)|$ are indicated collectively in FIG. 26 to be able to better establish the overlapping parts 128-130. Again a considerable reduction of the frequency ranges 129 and 130 designated by quasi-clutter areas, is achieved by raising the canceller characteristics of FIGS. 22-25 with a constant, say 12, resulting in the characteristics 131-134. The then obtained frequency ranges are denoted by 135-136, 137-139, 140-142 and 143-145, defined by $|H_z(\omega)| \geq |H_c(\omega)|$. These frequency ranges are shown collectively in FIG. 27, enabling to establish the overlapping parts 146-147 of the frequency ranges 135-145. A comparison of these frequency ranges with 128-130 again shows that by raising the canceller characteristics, the quasi-clutter areas are reduced considerably, whereby the clutter switching signal is generated.

A second feasible embodiment for k=3 is obtained with a symmetric eight-point type of filter for canceller 2 and a zero-velocity filter 3, where the numbers 1, −3⅓, 0, 14, −23⅓, 14, 0, −3⅓, 1 are the successive weighting factors for a canceller and the numbers 1, 3⅓, 0, −14, −23⅓, −14, 0, 3⅓, 1 the successive weighting factors for a zero-velocity filter.

I claim:

1. Search radar apparatus including an MTI video processing unit having a canceller for generating video signals of moving targets, a zero-velocity filter for generating clutter video signals, and clutter level indication means for determining a standard clutter level per range-azimuth clutter cell of the radar range with the application of clutter video signals, the improvement therein comprising a conditional circuit connected to the canceller and the zero-velocity filter for generating per range quant of each radar scan a clutter switching signal when for the range quant the signal value obtained with the zero-velocity filter is greater than the signal value obtained with the canceller, and further comprising a combination circuit connected to the zero-velocity filter and the conditional circuit for selecting the clutter video signals present with the clutter switching signals and for determining from said selected clutter video signals a temporary clutter level in each clutter cell and in each antenna revolution period for application to the clutter level indication means to produce a standard clutter level.

2. Search radar apparatus as claimed in claim 1, wherein said canceller and said zero-velocity filter function as a linear-phase filter of the transversal type, the weight factors denoted by corresponding numbers being matching to each other in magnitude.

3. Search radar apparatus as claimed in claim 1, wherein said conditional circuit comprises a revaluation circuit connected to the canceller for raising the level of the canceller-supplied video signal, and a comparator for generating a fixed-target indication signal upon receiving simultaneously a clutter signal and a raised video signal to produce a clutter switching signal when the clutter signal exceeds the raised video signal.

4. Search radar apparatus as claimed in claim 3, wherein said radar apparatus is designed to generate transmitter pulses with a plurality of staggered pulse repetition times.

5. Search radar apparatus as claimed in claim 4, wherein said conditional circuit comprises first memory means connected to the comparator for storing per range the quant the fixed-target indication signals for a period corresponding with a number of successive pulse repetition times, and means for generating the clutter switching signal in the presence of a defined minimum number of fixed-target indication signals obtained for corresponding range quants within said period in the memory means.

6. Search radar apparatus as claimed in claim 2, wherein the number of delay lines of the transversal filter with a delay time attuned to the pulse repetition time, is greater than or equal to the real number of weight factors of the filter.

7. Search radar apparatus as claimed in claim 1, wherein said combination circuit comprises selection means and third memory means for storing per antenna revoluton and per clutter cell the maximum value referred to as temporary clutter level of the clutter signals obtained through said selection means, said selection means supplying the third memory means with a clutter signal when the level of the latter clutter signal excess the pregenerated temporary clutter level value of the relevant clutter cell in the presence of the clutter switching signal.

8. Search radar apparatus as claimed in claim 7, wherein said selection means comprise a switching gate for passing the clutter signal under the control of the clutter switching signal; and a comparator for selecting the greater of the signal passed through the switching gate and the temporary clutter level value supplied by the first memory means for writing into the third memory means.

9. Search radar apparatus as claimed in claim 7, wherein said selection means comprise a comparator for generating a logical switching signal; an AND gate fed with said switching signal and the clutter switching signal; and a switching gate fed with the clutter signal and controlled by the AND gate, while the comparator is supplied with the clutter signal and a temporary clutter level value already available in the third memory means.

10. Search radar apparatus as claimed in claim 8 or 9, wherein said switching gate comprises a second input for receiving the already available temporary clutter level value.

11. Search radar apparatus as claimed in claim 8 or 9, wherein said selection means comprises a three-position switching unit for supplying a comparator signal designated as temporary clutter value to the selection means, the switching unit in a first position passes the zero value, in the second position the temporary clutter level value supplied by the first memory means, and in the third position the value supplied by selection means.

12. Search radar apparatus as claimed in claim 11, wherein said radar apparatus comprises a timing unit for setting the three-position switching unit to the first position upon the supply of the clutter signal obtained first in a clutter cell to selection means, to the second position upon the supply of each subsequent clutter signal obtained in the clutter cell having the minimum range value, and to the third position upon the supply of each other clutter signal obtained in the clutter cell.

13. A search radar apparatus as claimed in claim 6, said search radar apparatus generating transmitter pulses of relatively short duration, and further including a search radar apparatus for generating transmitter pulses of a second type, and wherein said search radar apparatuses alternatively generate a transmitter pulse of the second tyep and a series of (N) said transmitter pulses of relatively short duration, the same interval between the instant of generating a transmitter pulse of the second type and that of the next trasmitter pulse of short duriong being a fixed value.

14. Radar apparatus as claimed in claim 13, wherein said transversal filters produce a video signal only once during a period corresponding with the pulse repetition time of the second-type transmitter pulses.

15. Search radar apparatus as claimed in claim 1, wherein said video processing unit comprises a threshold circuit for producing per clutter cell, upon the supply of a clutter video signal and a threshold value obtained from the standard clutter level, a clutter video value in the event said clutter video signal exceeds the standard clutter level.

16. Search radar apparatus as claimed in claim 15, wherein said video processing unit comprises a video selection circuit, connection to the canceller and the threshold circuit, for selecting in magnitude the video signals supplied simultaneously.

* * * * *

UNITED STATES PATENT AND TRADEMARK OFFICE
CERTIFICATE OF CORRECTION

PATENT NO. : 4,542,382
DATED : September 17, 1985
INVENTOR(S) : WILLEM A. HOL

It is certified that error appears in the above—identified patent and that said Letters Patent is hereby corrected as shown below:

IN THE CLAIMS:

Claim 5, line 4, delete "the" (first occurrance)

Claim 7, line 8, change "excess" to --exceeds--

Claim 13, line 7, change "tyep" to --type--

Claim 13, line 8, change "same" to --time--

Claim 13, line 11, change "duriong" to --duration--

Claim 16, line 3, change "connection" to --connected--

Signed and Sealed this

Fifth Day of August 1986

[SEAL]

Attest:

DONALD J. QUIGG

Attesting Officer    Commissioner of Patents and Trademarks